US012787030B2

(12) United States Patent
Horiuchi et al.

(10) Patent No.: US 12,787,030 B2
(45) Date of Patent: Nov. 3, 2026

(54) TERMINAL AND SIDELINK COMMUNICATION CONTROL METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP); Yang Kang, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 567 days.

(21) Appl. No.: 18/040,636

(22) PCT Filed: Mar. 3, 2021

(86) PCT No.: PCT/JP2021/008275
§ 371 (c)(1),
(2) Date: Feb. 3, 2023

(87) PCT Pub. No.: WO2022/030040
PCT Pub. Date: Feb. 10, 2022

(65) Prior Publication Data

US 2023/0300859 A1 Sep. 21, 2023

(30) Foreign Application Priority Data

Aug. 7, 2020 (JP) ................................ 2020-134851

(51) Int. Cl.
*H04W 72/25* (2023.01)
*H04W 72/40* (2023.01)
*H04W 92/18* (2009.01)

(52) U.S. Cl.
CPC .......... *H04W 72/25* (2023.01); *H04W 72/40* (2023.01); *H04W 92/18* (2013.01)

(58) Field of Classification Search
CPC ..... H04W 72/02; H04W 72/04; H04W 72/12; H04W 72/20; H04W 72/25; H04W 72/40;
(Continued)

(56) References Cited

U.S. PATENT DOCUMENTS 12,200,757 B2 * 1/2025 Lee ......................... H04W 4/40
2020/0336253 A1 * 10/2020 He ........................ H04W 76/11
(Continued)

FOREIGN PATENT DOCUMENTS

WO 2020028662 A1 2/2020
WO 2020054042 A1 3/2020
(Continued)

OTHER PUBLICATIONS

Huawei, Hisilicon, "Sidelink resource allocation mode 2," R1-1812209, Agenda Item: 7.2.4.1.4, 3GPP TSG RAN WG1 Meeting #95, Spokane, USA, Nov. 12-16,2018. (14 pages).
(Continued)

*Primary Examiner* — Thomas R Cairns
(74) *Attorney, Agent, or Firm* — Seed Intellectual Property Law Group LLP

(57) ABSTRACT

The present invention improves the performance of sidelink communication. This terminal (200) comprises a control circuit (20A) for generating information pertaining to the cooperative use of sidelink resources between terminals, and a transmission circuit (20B) for transmitting the generated information to the other terminals.

16 Claims, 21 Drawing Sheets

(58) Field of Classification Search
CPC ..... H04W 72/53; H04W 76/14; H04W 92/18; H04W 8/005; H04W 76/23; H04W 84/18; H04W 88/04
See application file for complete search history.

(56) References Cited

U.S. PATENT DOCUMENTS

| | | | | |
|---|---|---|---|---|
| 2021/0243586 | A1 | 8/2021 | Osawa et al. | |
| 2021/0329603 | A1 | 10/2021 | Zhao et al. | |
| 2021/0385696 | A1* | 12/2021 | Yang | H04L 1/1812 |
| 2022/0345277 | A1* | 10/2022 | Ryu | H04L 5/0007 |
| 2023/0078636 | A1* | 3/2023 | Wang | H04W 72/02 370/329 |
| 2023/0156669 | A1* | 5/2023 | Zhou | H04W 72/02 370/329 |
| 2023/0171738 | A1* | 6/2023 | Di Girolamo | H04W 72/02 370/329 |

FOREIGN PATENT DOCUMENTS

| | | | |
|---|---|---|---|
| WO | 2020143059 | A1 | 7/2020 |
| WO | 2021207459 | A1 | 10/2021 |

OTHER PUBLICATIONS

LG Electronics, "Discussion on resouce allocation for NR sidelink Mode 2," R1-1905439, Agenda Item: 7.2.4.2.2, 3GPP TSG RAN WG1 #96bis, Xi'an, China, Apr. 8-12, 2019. (12 pages).

Nokia, Nokia Shanghai Bell, "NR Sidelink resource allocation for V2X communications," R2-1817680, Agenda item: 11.4.2.4, 3GPP TSG-RAN WG2 Meeting #104, Spokane, USA, Nov. 12-16, 2018. (3 pages).

Extended European Search Report dated Jan. 3, 2024, for the corresponding European Patent Application No. 21853513.6, 13 pages.

Kyocera, "Sidelink Physical Layer Structure," R1-1909015, Agenda Item: 7.2.4.1, 3GPP TSG-RAN WG1#98, Prague, Czech Republic, Aug. 26-30, 2019, 7 pages.

LG Electronics, "Discussion on resource allocation mechanism for NR V2X," R1-1901933, Agenda Item: 7.2.4.1.4, 3GPP TSG RAN WG1 #96, Athens, Greece, Feb. 25-Mar. 1, 2019, 12 pages.

National Taiwan University, "Discussion on NR Sidelink Resource Allocation for Mode 2," R1-1912502, Agenda Item: 7.2.4.2.2, 3GPPTSG RAN WG1 #99, Reno, US, Nov. 18-22, 2019, 5 pages.

Nokia, Nokia Shanghai Bell, "Discussion of physical layer structure for sidelink," R1-1910512, Agenda Item: 7.2.4.1, 3GPP TSG RAN WG1 #98bis, Chongqing, China, Oct. 14-20, 2019, 14 pages.

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Study on NR Vehicle-to-Everything (V2X) (Release 16)," 3GPP TR 38.885 V16.0.0, Mar. 2019. (122 pages).

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

International Search Report, mailed May 25, 2021, for International Patent Application No. PCT/JP2021/008275. (5 pages) (with English translation).

Itu, "IMT Vision—Framework and overall objectives of the future development of IMT for 2020 and beyond," Recommendation ITU-R M.2083-0, Sep. 2015. (21 pages).

LG Electronics, "WID revision: NR sidelink enhancement," RP-201385, Agenda Item: 9.10.3, 3GPP TSG RAN Meeting #88e, Electronic Meeting, Jun. 29-Jul. 3, 2020. (6 pages).

Office Action, dated Oct. 18, 2025, for Singaporean Patent Application No. 11202300809U. (10 pages).

Intel Corporation, "Summary#4 for AI 7.2.4.2.2 Mode-2 Resource Allocation," R1-1909892, Agenda item: 7.2.4.2.2, 3GPP TSG RAN WG1 Meeting #98, Prague, Czech Republic, Aug. 26-30, 2019. (34 pages).

* cited by examiner

TERMINAL AND SIDELINK COMMUNICATION CONTROL METHOD

TECHNICAL FIELD

The present disclosure relates to a terminal and a sidelink communication control method.

BACKGROUND ART

A communication system called the 5th Generation Mobile Communication System (5G) has been studied. The 3rd Generation Partnership Project (3GPP), an international standards-developing organization, has been studying development of the 5G communication system in terms of both the development of LTE/LTE-Advanced systems and a New Radio Access Technology (also referred to as New RAT or NR), which is a new method not necessarily backward compatible with the LTE/LTE-Advanced systems (see, for example, Non Patent Literature (hereinafter referred to as "NPL") 1).

In the 3GPP, it has been first considered to support vehicle to X (V2X) in the LTE system. It has been considered to support V2X also in NR in which a broader band can be used. Not only V2X but also further enhancement of communication using sidelink (SL) has been considered.

CITATION LIST

Non Patent Literature

NPL 1
3GPP TR 38.885 V16.0.0. Study on NR Vehicle-to-Everything (V2X) (Release 16), 2019 March
NPL 2
RP-201385, "WID revision: NR sidelink enhancement", LG Electronics, 3GPP TSG RAN Meeting #88e, Electronic Meeting, Jun. 29-Jul. 3, 2020

SUMMARY OF INVENTION

There is scope for further study, however, on further improvement in communication performance (e.g., at least one of reliability, low latency, and power consumption reduction) in sidelink.

One non-limiting and exemplary embodiment facilitates providing a terminal and a sidelink communication control method each capable of improving communication performance in sidelink.

A terminal according to an embodiment of the present disclosure includes: control circuitry, which, in operation, generates information on inter-UE coordinated usage of a sidelink resource; and transmission circuitry, which, in operation, transmits the information to another terminal.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve communication performance in sidelink.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
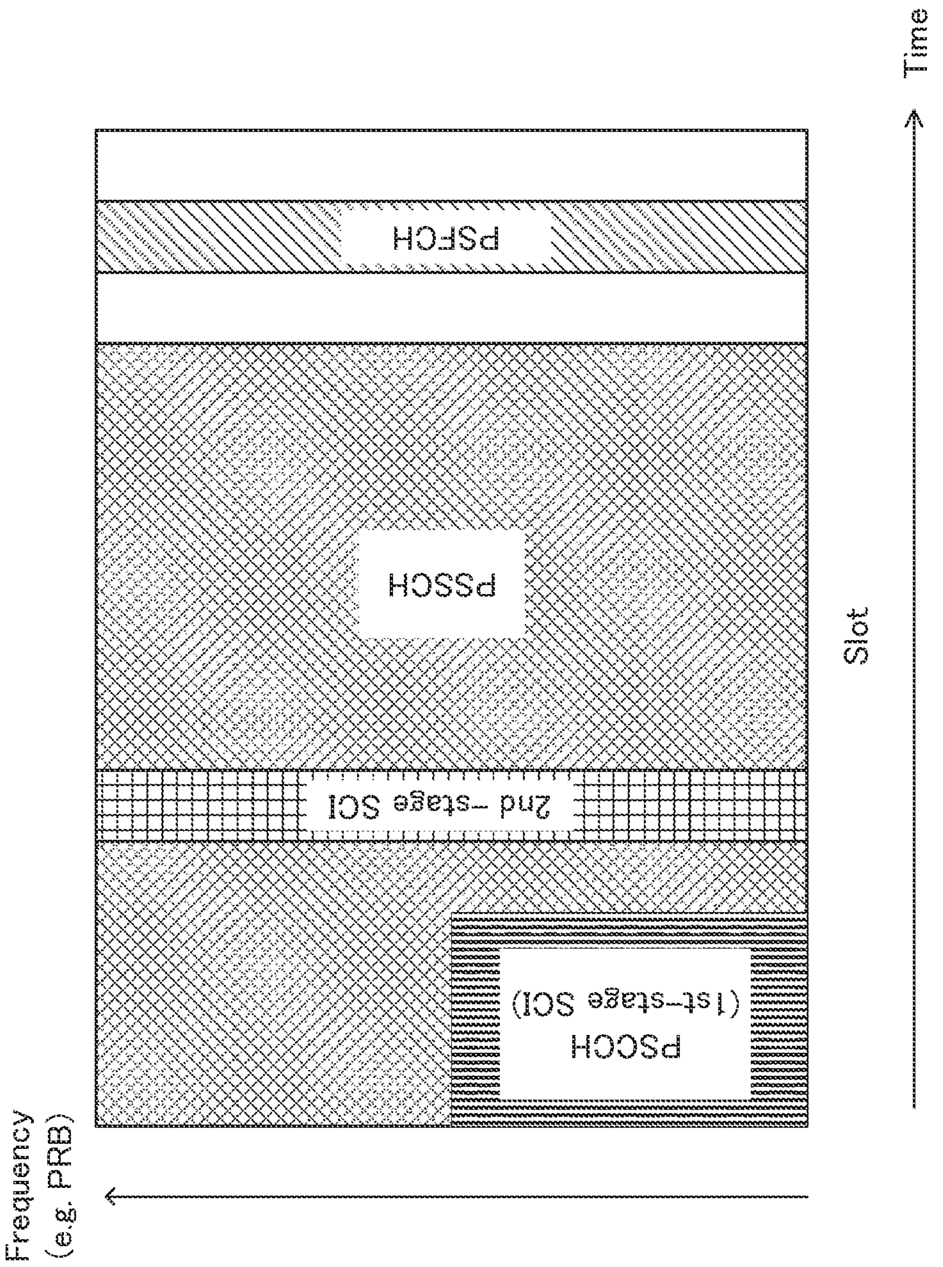
FIG. 1 illustrates exemplary channel mapping in a slot in sidelink.

Hereinafter, embodiments of the present disclosure will be described in detail with reference to the accompanying drawings.

Description of V2X

V2X assumes Vehicle to Vehicle (V2V), Vehicle to Infrastructure (V2I), Vehicle to Pedestrian (V2P), and Vehicle to Network (V2N) communication. In the V2V, V2I, or V2P, terminals can perform direct communication (e.g., at least one of transmission and reception) with each other using a link called sidelink (SL) or PC5 without through a network with a base station. V2N assumes communication through a link called Uu between abase station (referred to as gNB in NR and eNB in LTE, for example) and a terminal.

A resource to be used for sidelink is configured according to a SL bandwidth part (BWP) and a resource pool, for example. The SL BWP may specify a frequency band that can be used for sidelink and may be configured separately from a DL BWP and a UL BWP, which are configured for a link (Uu) between a base station and a terminal. The frequency bands possibly overlap each other between the SL BWP and the UL BWP.

The resource pool includes, for example, a resource in the frequency and time directions specified in a resource of the SL BWP. A plurality of resource pools may be configured for a single terminal. Frequency resources in a resource pool may be divided into units called subchannels, for example, and resource assignment may be configured in subchannel units. The subchannel may include a plurality of physical resource blocks (PRBs).

Description of Sidelink in NR

For NR V2X, studies have been conducted on supporting unicast, groupcast, and broadcast in sidelink communication (e.g., at least one of transmission and reception).

In unicast, one-to-one transmission from a transmitter terminal (e.g., also called transmitter UE or Tx UE) to a receiver terminal (e.g., receiver UE or Rx UE) is assumed, for example. In groupcast, transmission from a transmitter terminal to a plurality of receiver terminals included in a certain group is assumed, for example. In broadcast, transmission from a transmitter terminal without specifying a receiver terminal is assumed, for example. Note that UE is an abbreviation for user equipment and is an example of a "terminal".

Description of SL Channels

Studies have been carried out on configuring, for example, the following channels for NR SL: a physical SL control channel (PSCCH), physical SL shared channel (PSSCH), physical SL feedback channel (PSFCH), and physical SL broadcast channel (PSBCH).

The PSCCH is an exemplary control channel in SL, and the PSSCH is an exemplary data channel in SL. The PSFCH is an exemplary channel used for transmission of a feedback signal in SL, and the PSBCH is an exemplary broadcast channel used for transmission not specifying a receiver terminal. Note that, in the following description, a "signal" and "information" may be replaced with each other depending on the context.

The PSCCH is mapped with, for example, a control signal (control information) called sidelink control information (SCI). The SCI includes, for example, information (or parameter) on at least one of transmission and reception of the PSSCH, such as resource assignment information for a data signal (e.g., PSSCH).

Information contents of the SCI may be divided (sorted or classified) into, for example, first information (or control information) and second information (or control information), as described later. In other words, the SCI may include, for example, the "first control information" and the "second control information" on SL. The "second control information" may be considered to be exemplary information related to the "first control information". The "first control information" and the "second control information" may be referred to as, for example, "1st stage SCI" and "2nd stage SCI" respectively.

The 1st stage SCI may be mapped to the PSCCH, which is an exemplary SL control channel, and the 2nd stage SCI may be mapped to the PSSCH, which is an exemplary SL data channel. In other words, the SCI may be mapped by being distributed between the PSCCH and PSSCH. Note that the term "mapping" may be replaced with another appropriate term among those skilled in the art, such as "assignment (allocation)" and "(mapping) pattern" (the same applies to the following description).

The PSSCH is mapped with, for example, a data signal, or a data signal and SCI (e.g., 2nd stage SCI).

In the PSFCH, a feedback signal (e.g., hybrid automatic repeat request (HARQ) feedback) to a PSSCH (e.g., data signal) is mapped, for example. The feedback signal may include, for example, a response signal indicating ACK or NACK (e.g., also referred to as ACK/NACK information or HARQ-ACK).

The feedback signal is considered to be applied, for example, to a case where the PSSCH is transmitted and received by unicast and groupcast. The ACK and NACK may be respectively referred to as HARQ-ACK and HARQ-NACK, for example.

The PSBCH is mapped with, for example, a broadcast signal not specifying a receiver terminal. The PSBCH is transmitted with, for example, a sidelink primary synchronization signal (S-PSS) and a sidelink secondly synchronization signal (S-SSS), which are signals for synchronization and generally referred to as a sidelink synchronization signal block (S-SSB).

Description of SCI

The following is non-limiting and exemplary information respectively included in the 1st stage SCI and the 2nd stage SCI.

1st Stage SCI

Priority—3 bits
Frequency resource assignment
Time resource assignment-5 bits or 9 bits
Resource reservation period—[log 2 (N_(reservePeriod)] bits or 0 bits
DMRS pattern [x] bits or 0 bits
2nd stage SCI format 2 bits
Beta_offset indicator 2 bits
Number of DMRS port 1 bit
Modulation and coding scheme—5 bits
Additional MCS table indicator—2 bits or 0 bits
PSFCH overhead indication—1 bit
Reserved—[sl-NumReservedBits] bits or 0 bits

2nd Stage SCI

Two types of formats, which are SCI format 2-A and SCI format 2-B, may be prepared for the 2nd stage SCI as below, for example.

SCI Format 2-A

HARQ process number—[log_2 (N_process)] bits
New data indicator—1 bit
Redundancy version—2 bits
Source ID—8 bits
Destination ID—16 bits
HARQ feedback enabled/disabled indicator—1 bit
Cast type indicator—2 bits
CSI request—1 bit SCI Format 2-B HARQ process number—[log_2 (N_process)] bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits In SL communication in V2X, a terminal determines a resource to be used for transmission after sensing to confirm resource usage (or reservation status) by other terminals, for example. Dividing the information contents of the SCI into two reduces the number of bits and the size of the 1st stage SCI, which provides a benefit of reducing an area used for the sensing. The 1st stage SCI may be mapped to, for example, the PSCCH, and the 2nd stage SCI may be mapped to, for example, the PSSCH (may be a part of the PSSCH). Note that the "DMRS" is an abbreviation for a demodulation reference signal, and the "CSI" is an abbreviation for channel state information.

FIG. 1 illustrates exemplary mapping of the PSCCH, PSSCH, and PSFCH in a slot. The PSFCH is sometimes not mapped depending on the configuration. In addition, the number of symbols of the PSSCH varies depending on the configuration. Mapping of the 2nd stage SCI may be changed according to mapping of a DMRS in a PSSCH that is not illustrated, for example. The 1st stage SCI may be mapped from a frequency resource lower than a frequency resource where the PSSCH is assigned, for example. One slot is composed of, for example, 14 symbols (12 symbols in a case of using extended cyclic prefix (CP)).

Description of SL Modes

SL communication includes, for example, two modes (e.g., Mode 1 and Mode 2).

In Mode 1, for example, a base station determines (i.e., schedules) a resource that a terminal uses for SL (referred to as an SL resource, for example).

In Mode 2, for example, a terminal selects (or determines) a resource to be used for SL from resources in a resource pool configured in advance. In other words, a base station need not schedule the SL resource in Mode 2.

Mode 1 is intended to be used, for example, in an environment where the base station and the terminal are connected and the terminal performing sidelink communication can receive an indication from the base station. Meanwhile, in Mode 2, the terminal can determine a resource to be used for SL without an indication from the base station, for example, so that the sidelink communication is possible with a terminal under a different operator or a terminal outside coverage, for example.

Sidelink has been described, thus far.

Overview of Communication System

Figure 2:
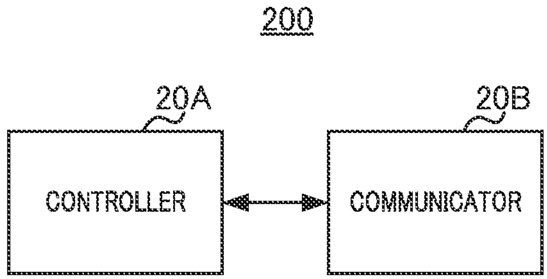
FIG. 2 is a block diagram illustrating an exemplary configuration of a part of a terminal.
Figure 3:
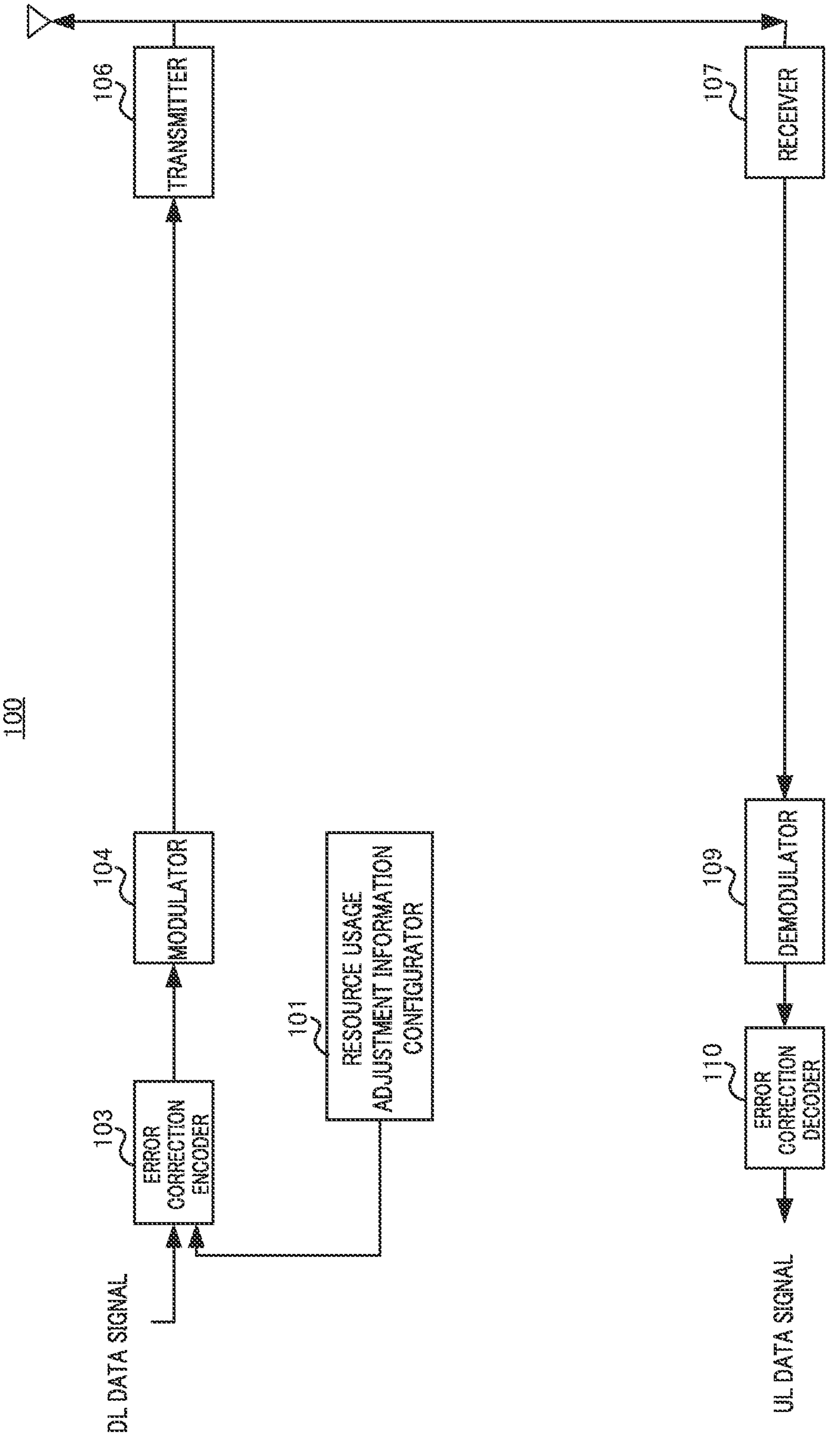
FIG. 3 is a block diagram illustrating an exemplary configuration of a base station.

A communication system according to the present embodiment includes, for example, terminal 200 exemplified in FIG. 2 and base station 100 exemplified in FIG. 3. The number of terminals 200 may be one or more, but is two or more in a case of focusing on the sidelink communication.

FIG. 2 is a block diagram illustrating an exemplary configuration of a part of terminal 200 according to the embodiment. Terminal 200 illustrated in FIG. 2 may include, for example, controller (or control circuitry) 20A and communicator (or communication circuitry) 20B.

From the perspective of transmitter terminal 200 in sidelink, controller 20A determines and generates, for example, information for adjusting (or performing coordination control of) resource usage (or utilization) in sidelink communication between terminals 200. This information is an example of information on inter-UE coordinated usage of sidelink resources, and may be considered to be a type of control information transmitted or received between terminals 200. In addition, this information may be referred to as, for example, "resource usage adjustment information", "resource coordination control information", or "inter-UE coordinate information" for convenience.

From the perspective of a transmitter terminal in sidelink, communicator 20B transmits the resource usage adjustment information to another terminal 200. Thus, communicator 20B may be considered to be exemplary transmission circuitry that transmits the resource usage adjustment information, from the perspective of transmitter terminal 200 in sidelink. From the perspective of receiver terminal 200 in sidelink, communicator 20B receives the resource usage adjustment information transmitted by another terminal 200. Thus, communicator 20B may be considered to be exemplary reception circuitry that receives the resource usage adjustment information, from the perspective of receiver terminal 200. In addition, from the perspective of a receiver terminal in sidelink, controller 20A determines a resource to be used for sidelink communication (e.g., transmission) based on the resource usage adjustment information received by communicator 20B.

Configuration of Base Station 100

FIG. 3 is a block diagram illustrating an exemplary configuration of base station 100 according to the embodiment. As exemplified in FIG. 3, base station 100 includes, for example, resource usage adjustment information configurator 101, error correction encoder 103, modulator 104, transmitter 106, receiver 107, demodulator 109, and error correction decoder 110.

Resource usage adjustment information configurator 101 determines whether to cause terminal 200 to transmit sidelink resource usage adjustment information based on a use case, which is not illustrated, and information reported from terminal 200, such as information of a characteristic or capability of terminal 200. When determining to cause terminal 200 to transmit the sidelink resource usage adjustment information, resource usage adjustment information configurator 101 outputs, to error correction encoder 103, information on a transmission configuration for the resource usage adjustment information as higher layer (e.g., RRC) signaling, for example.

Note that, in this example, information transmitted by a higher layer (e.g., RRC) is generated in resource usage adjustment information configurator 101, and transmission of the resource usage adjustment information is configured for terminal 200; however, this configuration may be a configuration in an application layer called pre-configured, or may be configured in a subscriber identity module (SIM) in advance, for example. Terminal 200 can operate without the configuration from base station 100.

Error correction encoder 103, for example, takes a transmission data signal (DL data signal) and higher layer signaling as input, performs error correction encoding on the input signal, and outputs the encoded signal to modulator 104.

Modulator 104, for example, performs modulation processing on the signal inputted from error correction encoder 103, and outputs the modulated data signal to transmitter 106.

Transmitter 106, for example, performs radio transmission processing, such as up-conversion and amplification, on the signal inputted from modulator 104, and transmits the radio signal to terminal 200 from an antenna.

Receiver 107, for example, receives a signal transmitted from terminal 200 at the antenna, performs radio reception processing such as low noise amplification and down-conversion, and outputs the received signal to demodulator 109.

Demodulator 109, for example, performs demodulation processing on the input signal, and outputs the demodulated signal to error correction decoder 110.

Error correction decoder 110, for example, decodes the signal inputted from demodulator 109, and obtains the received data signal (UL data signal) from terminal 200.

Note that, in Mode 1, SCI information transmitted by terminal 200 in sidelink may be generated in base station 100 (e.g., resource usage adjustment information configurator 101 or another block that is not illustrated). The SCI information generated by base station 100 may be transmitted to terminal 200 as higher layer signaling or a signal in a physical layer (e.g., physical downlink control channel (PDCCH)), for example.

Configuration of Terminal 200

Figure 4:
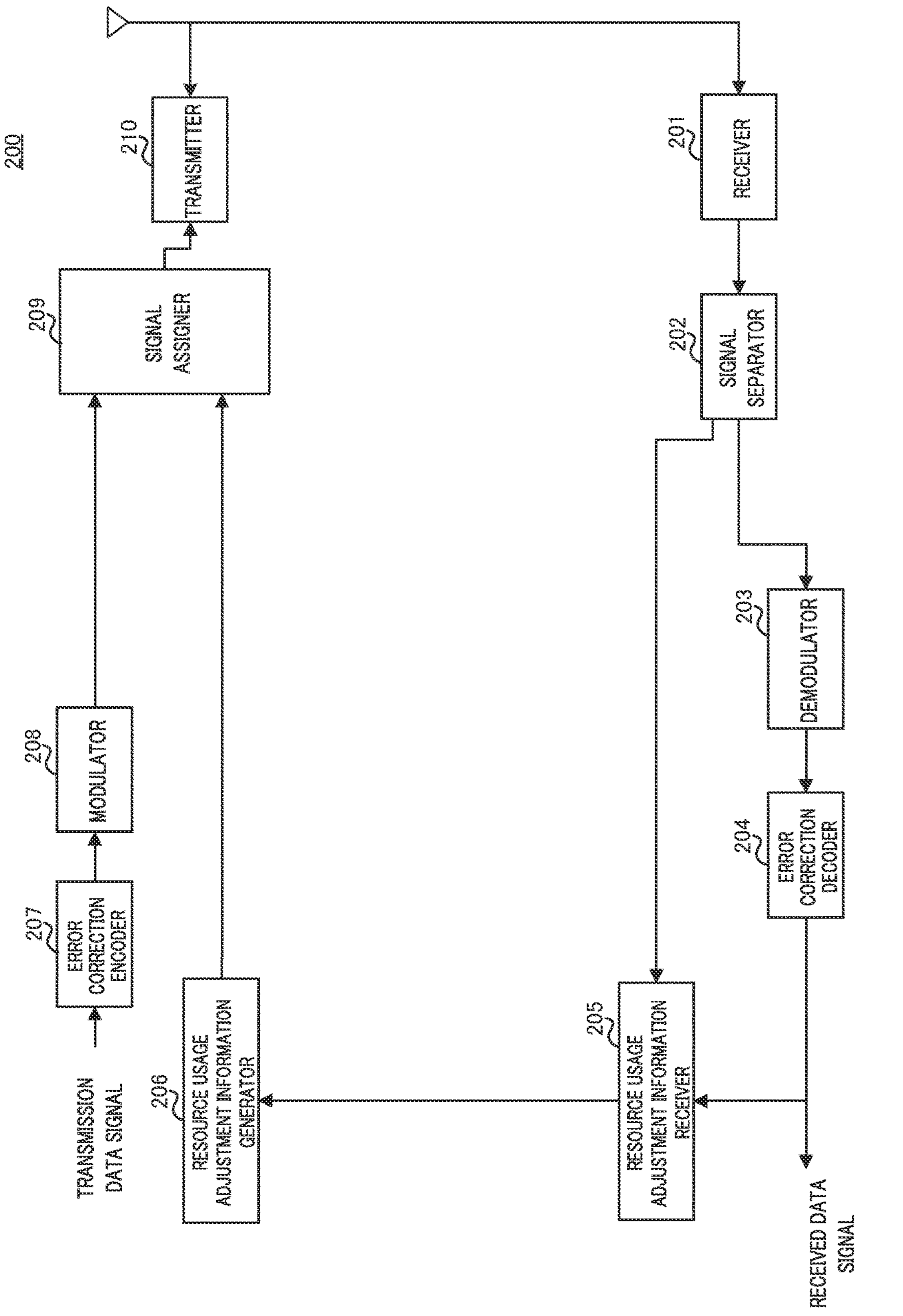
FIG. 4 is a block diagram illustrating an exemplary configuration of the terminal.

FIG. 4 is a block diagram illustrating an exemplary configuration of terminal 200 according to the embodiment. Terminal 200 can be either a transmitter terminal or a receiver terminal in sidelink communication. In FIG. 4, terminal 200 includes, for example, receiver 201, signal separator 202, demodulator 203, error correction decoder 204, resource usage adjustment information receiver 205, resource usage adjustment information generator 206, error correction encoder 207, modulator 208, signal assigner 209, and transmitter 210.

Receiver 201, for example, receives a received signal by an antenna, and outputs the signal to signal separator 202 after performing radio reception processing, such as low noise amplification and down-conversion, on the received signal.

Signal separator 202, for example, separates a received data signal and information indicating a result of sensing (hereinafter, sometimes referred to as "sensing information") from the output signal of receiver 201. The received data signal is outputted to demodulator 203, for example. The sensing information is outputted to resource usage adjustment information receiver 205, for example. Note that "sensing" may be considered to be reception of the 1st stage SCI transmitted from another terminal 200 in a certain time period.

Demodulator 203, for example, performs demodulation processing on the received data signal inputted from signal separator 202, and outputs the demodulated signal to error correction decoder 204.

Error correction decoder 204, for example, decodes the demodulated signal inputted from demodulator 203, and performs error determination such as a cyclic redundancy check (CRC), for example, on the decoded signal. The signal determined to have no error as a result of the error determination is outputted as the received data signal. In addition, error correction decoder 204 outputs, to resource usage adjustment information receiver 205, configuration information on the resource usage adjustment received in the higher layer, for example, in the received data signal.

Resource usage adjustment information receiver 205, for example, receives the configuration information on the resource usage adjustment inputted from error correction decoder 204 as higher layer signaling. In addition, resource usage adjustment information receiver 205, for example, receives information of a resource used by another terminal 200 obtained by sensing, which is inputted from signal separator 202, or the resource usage adjustment information transmitted by another terminal 200. The information received by resource usage adjustment information receiver 205 is outputted to resource usage adjustment information generator 206, for example. When terminal 200 determines a resource to be used based on the configuration information on the resource usage adjustment, for example, the resource to be used is indicated to signal assigner 209.

Resource usage adjustment information generator 206, for example, determines whether to generate the resource usage adjustment information to be transmitted to another terminal 200 based on the pre-configured configuration information or the resource usage adjustment information inputted from resource usage adjustment information receiver 205. In a case of generating the resource usage adjustment information for another terminal 200, resource usage adjustment information generator 206, for example, determines in which channel the resource usage adjustment information is transmitted, and outputs the generated resource usage adjustment information to signal assigner 209.

Error correction encoder 207 takes a sidelink transmission data signal (SL data signal) as input, for example, performs error correction encoding on the transmission data signal, and outputs the encoded signal to modulator 208.

Modulator 208, for example, modulates the signal inputted from error correction encoder 207, and outputs the modulated signal to signal assigner 209.

Signal assigner 209, for example, assigns the PSCCH transmitting the 1st stage SCI, the PSSCH transmitting the SL data signal, and the 2nd stage SCI mapped to the PSSCH to resources based on assignment information inputted from resource usage adjustment information receiver 205. When there is an input from resource usage adjustment information generator 206, signal assigner 209 assigns the resource usage adjustment information to a corresponding channel of SL resources, for example. The signals assigned to resources are outputted to transmitter 210.

Note that ACK/NACK information may be assigned to an SL feedback channel (e.g., PSFCH), for example, in signal assigner 209.

Transmitter 210 performs radio transmission processing, such as amplification and up-conversion, on the input signal from signal assigner 209, and transmits the radio signal from an antenna.

Focusing on transmission processing, signal assigner 209 may correspond to controller 20A illustrated in FIG. 1, for example. Controller 20A may include, for example, at least one of 1st stage SCI generator 212-1, 2nd stage SCI generator 212-2, resource usage adjustment information generator 206, and signal assigner 209. Further, transmitter 210 may correspond to communicator 20B illustrated in FIG. 1.

Focusing on reception processing, in contrast, signal separator 202 may correspond to controller 20A illustrated in FIG. 1, for example. Controller 20A may include, for example, at least one of 1st stage SCI receiver 211-1, 2nd stage SCI receiver 211-2, resource usage adjustment information receiver 205, and signal separator 202. Further, receiver 201 may correspond to communicator 20B illustrated in FIG. 1.

(Exemplary Operation of Terminal 200)

Next, an exemplary operation of terminal 200 will be described.

Figure 5:
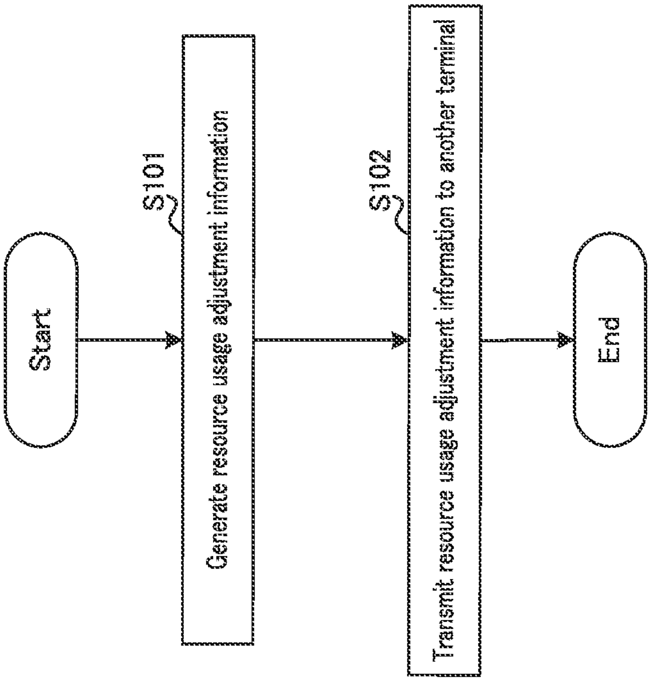
FIG. 5 is a flowchart describing an exemplary (transmission) operation of the terminal.
Figure 6:
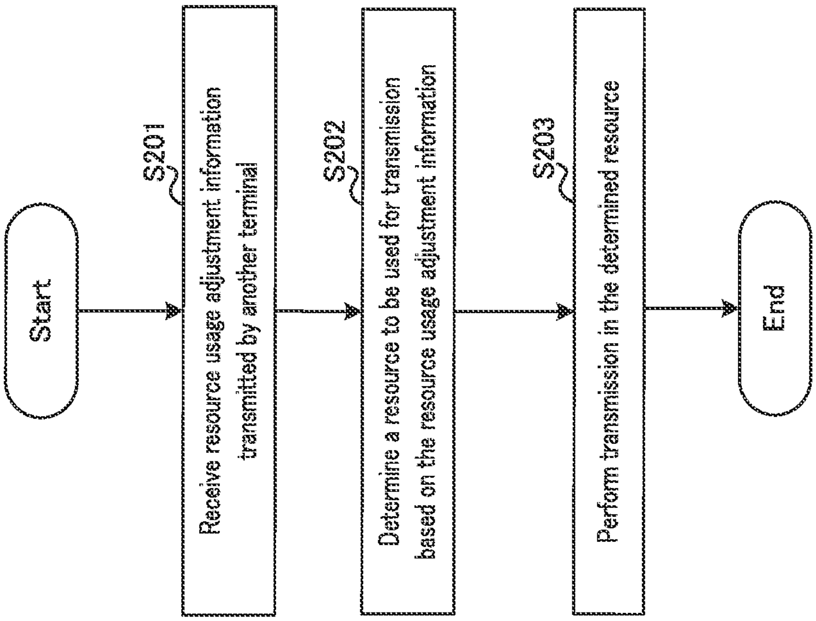
FIG. 6 is a flowchart describing an exemplary (reception) operation of the terminal.

FIG. 5 is a flowchart describing an exemplary operation of terminal 200 focusing on the transmission processing, and FIG. 6 is a flowchart describing an exemplary operation of terminal 200 focusing on the reception processing. The exemplary operations described in FIGS. 5 and 6 may be considered to be exemplary operations in single terminal 200 or in different terminals 200. For example, the exemplary operation described in FIG. 5 may correspond to an exemplary operation of transmitter terminal 200, and the exemplary operation described in FIG. 6 may correspond to an exemplary operation of receiver terminal 200.

As exemplified in FIG. 5, terminal 200 generates the resource usage adjustment information (S110). Terminal 200 then transmits the generated resource usage adjustment information to another terminal 200 (S102).

As exemplified in FIG. 6, terminal 200 receives the resource usage adjustment information transmitted by another terminal 200 (S201). Terminal 200 then determines a resource to be used for sidelink transmission based on the resource usage adjustment information received from another terminal (S202), and performs transmission using the determined resource (S203).

Such operations allows receiver terminal 200, for example, to select or determine a resource to be used for sidelink transmission while avoiding a resource reserved by another terminal 200 including a transmitter terminal (e.g., resource possibly used by another terminal 200 for transmission).

This reduces a risk of collision (or contention) in transmission resources used by terminals 200 in sidelink resources, thereby contributing to improvement in sidelink communication performance such as reliability, low latency, and power consumption reduction in sidelink communication.

Another Exemplary Configuration of Terminal 200

Figure 7:
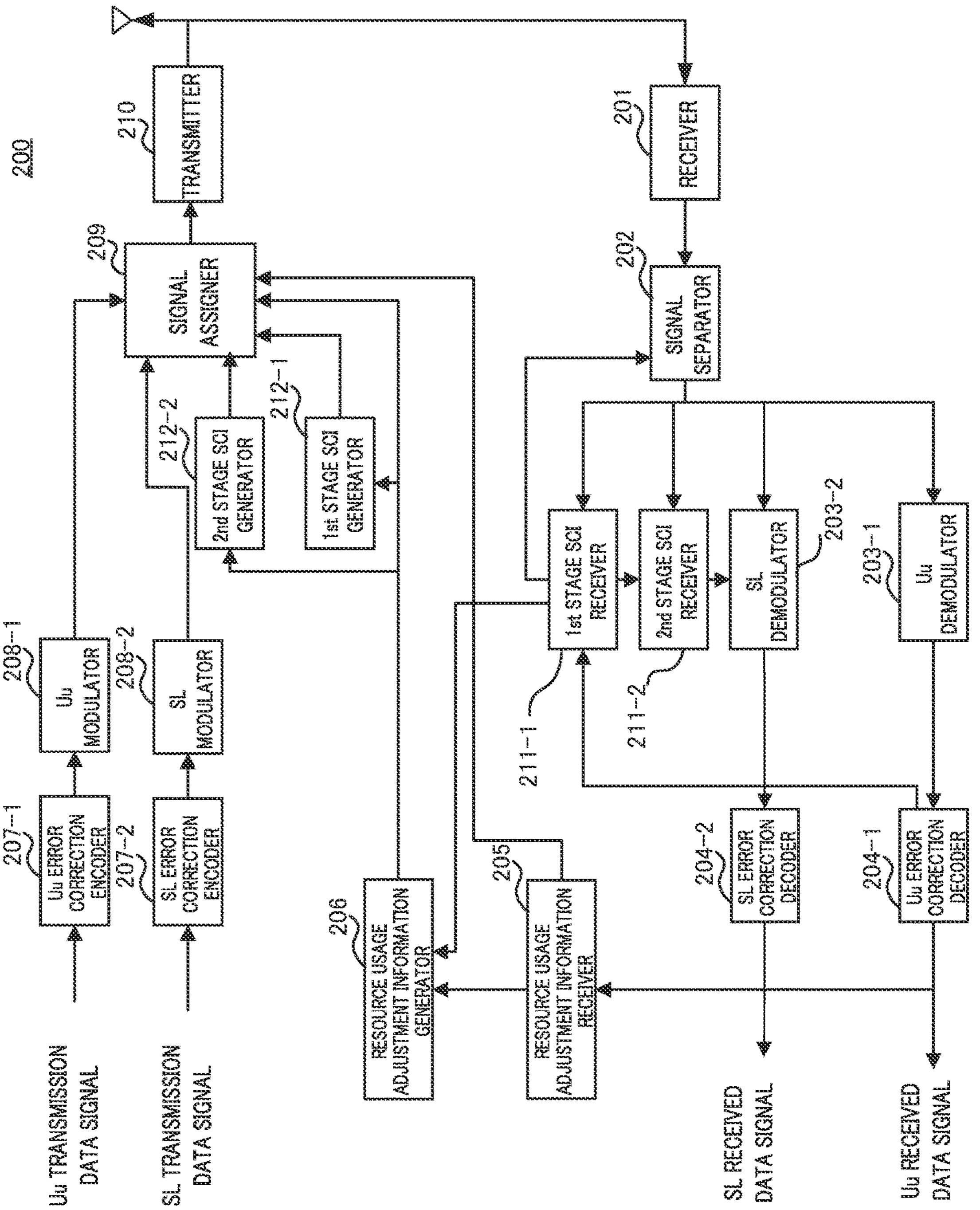
FIG. 7 is a block diagram illustrating another exemplary configuration of the terminal.

FIG. 7 is a block diagram illustrating another exemplary configuration of terminal 200 according to the embodiment. The configuration exemplified in FIG. 7 may be considered to correspond to the configuration exemplified in FIG. 4 with the following modifications. The demodulator, error correction decoder, error correction encoder, and modulator are respectively configured for Uu link and for SL as individual blocks, and a relationship between the resource usage adjustment information and the SCI is clarified as a non-limiting example. Note that the "Uu link" indicates a link between base station 100 and terminal 200. In FIG. 7, blocks with the same reference signs as in FIG. 4 may be considered to correspond to the blocks already described using FIG. 4.

In FIG. 7, terminal 200 includes, for example, receiver 201, signal separator 202, 1st stage SCI receiver 211-1, 2nd stage SCI receiver 211-2, Uu demodulator 203-1, SL demodulator 203-2, Uu error correction decoder 204-1, and SL error correction decoder 204-2. Terminal 200 also includes, for example, resource usage adjustment information receiver 205, resource usage adjustment information generator 206, 1st stage SCI generator 212-1, and 2nd stage SCI generator 212-2. Terminal 200 further includes, for example, Uu error correction encoder 207-1, SL error correction encoder 207-2, Uu modulator 208-1, SL modulator 208-2, signal assigner 209, and transmitter 210.

Receiver 201, for example, receives a received signal by an antenna, and outputs the signal to signal separator 202 after performing radio reception processing, such as low noise amplification and down-conversion, on the received signal.

Signal separator 202 separates a Uu link signal and an SL signal from the signal received by receiver 201 based on the configuration information on the resource usage adjustment, for example. The Uu link signal is outputted to Uu demodulator 203-1. In addition, signal separator 202 separates a PSCCH signal from the SL signal, for example, and outputs the PSCCH signal to 1st stage SCI receiver 211-1. Signal separator 202 also separates the 2nd stage SCI in a PSSCH from the SL signal based on resource assignment information inputted from 1st stage SCI receiver 211-1 and outputs the 2nd stage SCI to 2nd stage SCI receiver 211-2. Further, signal separator 202 separates a data portion addressed to terminal 200 in the PSSCH from the SL signal, for example, and outputs the data portion to SL demodulator 203-2.

1st stage SCI receiver 211-1, for example, attempts to demodulate and decode the PSCCH signal inputted from signal separator 202. When the decoding is successful (i.e., when the SCI is detected), 1st stage SCI receiver 211-1 outputs, to signal separator 202, assignment information of the frequency and time resources of the PSSCH and the 2nd stage SCI format information, which are included in the SCI. 1st stage SCI receiver 211-1 also outputs information of a resource to be used by terminal 200 for sidelink transmission to resource usage adjustment information generator 206, for example.

2nd stage SCI receiver 211-2, for example, confirms (or determines) whether the signal received by receiver 201 is a signal addressed to the received terminal 200 based on the source ID and destination ID included in the 2nd stage SCI. When the signal received by receiver 201 is a signal addressed to the received terminal 200, 2nd stage SCI receiver 211-2, for example, outputs information to be used for demodulation and decoding of the PSSCH to SL demodulator 203-2.

Uu demodulator 203-1, for example, performs demodulation processing on the signal inputted from signal separator 202, and outputs the demodulated signal to Uu error correction decoder 204-1.

Uu error correction decoder 204-1 decodes the demodulated signal inputted from Uu demodulator 203-1, and outputs the decoded signal. Higher layer signaling in the decoded signal, for example, is outputted to resource usage adjustment information receiver 205.

SL demodulator 203-2, for example, performs demodulation processing on the signal inputted from signal separator 202 based on the 2nd stage SCI information from 2nd stage SCI receiver 211-2, and outputs the demodulated signal to SL error correction decoder 204-2.

SL error correction decoder 204-2, for example, decodes the demodulated signal inputted from SL demodulator 203-2, and performs error determination such as CRC, for example, on the decoded signal. The signal determined to have no error as a result of the error determination is outputted as a received data signal.

Resource usage adjustment information receiver 205, for example, receives the configuration information on the resource usage adjustment inputted from Uu error correction decoder 204-1 as higher layer signaling or a PSSCH signal. In addition, resource usage adjustment information receiver 205, for example, receives information of a resource used by another terminal 200 obtained by sensing, which is inputted from 1st stage SCI receiver 211-1, or the resource usage adjustment information transmitted by another terminal 200. The information received by resource usage adjustment information receiver 205 is outputted to resource usage adjustment information generator 206, for example. When a resource to be used by itself is determined based on the configuration information on the resource usage adjustment, for example, resource usage adjustment information receiver 205 indicates the resource to be used to signal assigner 209.

Resource usage adjustment information generator 206, for example, determines whether to generate the resource usage adjustment information to be transmitted to another terminal 200 based on the pre-configured configuration information or the resource usage adjustment information inputted from resource usage adjustment information receiver 205. In a case of generating the resource usage adjustment information for another terminal 200, resource usage adjustment information generator 206, for example, determines which channel the resource usage adjustment information is transmitted, and outputs the generated resource usage adjustment information to signal assigner 209.

In a case where the resource usage adjustment information is transmitted using the PSSCH, for example, resource usage adjustment information generator 206 instructs 2nd stage SCI generator 212-2 to generate the 2nd stage SCI indicating that the resource usage adjustment information is transmitted using the PSSCH. Resource usage adjustment information generator 206 also instructs 1st stage SCI generator 212-1 to transmit a signal indicating that the format of the 2nd stage SCI is changed, for example. Further, resource usage adjustment information generator 206 outputs the resource usage adjustment information to be transmitted using the PSSCH to signal assigner 209, for example.

1st stage SCI generator 212-1, for example, determines a frequency resource for transmitting the PSSCH and generates SCI including the determined information. 1st stage SCI generator 212-1 inputs the generated SCI as a control signal to signal assigner 209 and outputs it as a signal to be transmitted using the PSCCH to signal assigner 209. In addition, 1st stage SCI generator 212-1 generates information indicating the change of the format of the 2nd stage SCI according to the instruction from resource usage adjustment information generator 206, for example, and maps the generated information to the 1st stage SCI.

2nd stage SCI generator 212-2, for example, generates SCI (2nd stage SCI) and outputs the generated SCI to signal assigner 209. The SCI may include, for example, information identifying the source terminal 200 (e.g., source ID), information identifying the destination terminal 200 (e.g., destination ID), and information on demodulation and decoding. When indicating the resource usage adjustment information to another terminal 200 using the PSSCH based on the instruction from resource usage adjustment information generator 206, 2nd stage SCI generator 212-2 may include, in the 2nd stage SCI, information indicating the transmission of the resource usage adjustment information, for example.

Uu error correction encoder 207-1 takes a Uu link transmission data signal (Uu data signal) as input, for example, performs error correction encoding on the transmission data signal, and outputs the encoded signal to Uu modulator 208-1.

Uu modulator 208-1, for example, modulates the signal inputted from Uu error correction encoder 207-1, and outputs the modulated signal to signal assigner 209.

SL error correction encoder 207-2 takes an SL transmission data signal (SL data signal) as input, for example, performs error correction encoding on the transmission data signal, and outputs the encoded signal to SL modulator 208-2.

SL modulator 208-2, for example, modulates the signal inputted from SL error correction encoder 207-2, and outputs the modulated signal to signal assigner 209.

Signal assigner 209, for example, assigns the PSCCH transmitting the 1st stage SCI, the PSSCH transmitting the SL data signal, and the 2nd stage SCI mapped to the PSSCH to resources based on the SL signal assignment information inputted from 1st stage SCI generator 212-1. When there is an input from resource usage adjustment information receiver 205, signal assigner 209 assigns the SL data signal to the PSSCH according to the instruction from resource usage adjustment information receiver 205, for example. When there is an input from resource usage adjustment information generator 206, signal assigner 209 assigns the resource usage adjustment information to the PSSCH, for example. Signal assigner 209 also assigns the UL data signal to a resource to be used for a PUSCH between base station 100 and terminal 200, for example. The signals assigned to resources in such a manner are outputted to transmitter 210.

ACK/NACK information may be assigned to an SL feedback channel (e.g., PSFCH), for example, in signal assigner 209.

Transmitter 210, for example, performs radio transmission processing, such as amplification and up-conversion, on the input signal from signal assigner 209, and transmits the radio signal from an antenna.

Note that, although the demodulator, error correction decoder, error correction encoder, and modulator are respectively configured for Uu link and for SL as individual blocks in the configuration exemplified in FIG. 7, some or all of the blocks may integrally form a common block.

In addition, the resource usage adjustment information is not necessarily received by terminal 200 as higher layer signaling. For example, the resource usage adjustment information may be preconfigured in a SIM or may be preconfigured to terminal 200 by an application layer called Pre-configured. Terminal 200 can use the preconfigured information for the resource usage adjustment without receiving the configuration information on the resource usage adjustment.

Embodiment

In the present embodiment, terminal 200 transmits, for example, the resource usage adjustment information to another terminal 200. The another terminal 200 that has received the resource usage adjustment information, for example, judges or determines which resource is possibly used by still another terminal 200 or which resource to use for transmission. The use of the resource usage adjustment information reduces a risk of collision with a resource used by the still another terminal 200 for transmission.

In a case where there are a plurality of pieces of resource usage adjustment information, terminal 200 may determine (or configure) which resource usage adjustment information to transmit and which channel to use for the transmission of the resource usage adjustment information. In this manner, the resource usage adjustment information can be selected and configured to terminal 200 according to the characteristic or capability of terminal 200.

The resource usage adjustment information may configure one or more of the plurality of types of information described below. A resource may be specified by a unit of frequency and time resources, for example. As a non-limiting example, frequency domain may be divided into a plurality of subchannels, time domain may be divided into a plurality of slots, and a resource may be specified by the slot number and the subchannel number.

An exemplary coordinated operation between terminals 200 will be described. In the following, terminal 200 transmitting the resource usage adjustment information is referred to as UE-A, and terminal 200 receiving the resource usage adjustment information is referred to as UE-B. Note that, in a case where the resource usage adjustment information is configured to be transmitted so as to be receivable only by specific terminal 200, such as unicast, only the specific UE can receive the resource usage adjustment information.

Meanwhile, in a case where the resource usage adjustment information is configured to be transmitted so as to be receivable by a plurality of UEs, such as broadcast or group cast, the plurality of UEs can receive the resource usage adjustment information. Thus, not only a single terminal 200 corresponds to UE-B.

It is assumed that UE-A that has transmitted the resource usage adjustment information does not perform transmission in a resource indicated to another UE as an available resource. This avoids or prevents collision of resources used by UE-A and another UE when the another UE performs transmission.

Resource Usage Adjustment Information 1

UE-A receives the 1st stage SCI transmitted by another UE in a certain time period. This is also referred to as sensing. Reception of the 1st stage SCI allows UE-A to obtain information of a resource in which the another UE is scheduled to perform transmission.

UE-A may collectively transmit information of resources in which other UEs are scheduled to perform transmission. At that time, UE-A may also transmit information of a resource in which UE-A is scheduled to perform transmission. In addition, in a case where UE-A is aware of unavailable resources by an indication of a layer such as RRC or media access control (MAC), an indication or configuration from an application layer, or the like, which are obtained from information other than the 1st stage SCI, UE-A may include information of such resources and transmit information of available resources and unavailable resources as the resource usage adjustment information.

In this manner, UE-B that has received the resource usage adjustment information from UE-A can obtain the information on the resource usage that is not obtained because no 1st stage SCI is received. For example, UE that cannot perform reception while performing transmission in the same frequency band does not receive the 1st stage SCI from another UE during transmission. This is called a half duplex issue. The UE can obtain (or compensate for) information that is not received due to the half duplex issue from the resource usage adjustment information from another UE. Another benefit is that UE that shortens the sensing time of the 1st stage SCI for power consumption reduction can obtain, from another UE, information that cannot be obtained in the shortened sensing time.

Note that UE-A may indicate to UE-B, for example, information on a window or a slot in which sensing is "available" for UE-A, or information on a window or a slot in which sensing is "not available" for UE-A. UE-B can recognize and grasp resource information that UE-A can obtain by sensing or information that UE-A cannot obtain.

As described above, UE may take into consideration the resource usage adjustment information when selecting a resource to be used for SL.

Figure 8:
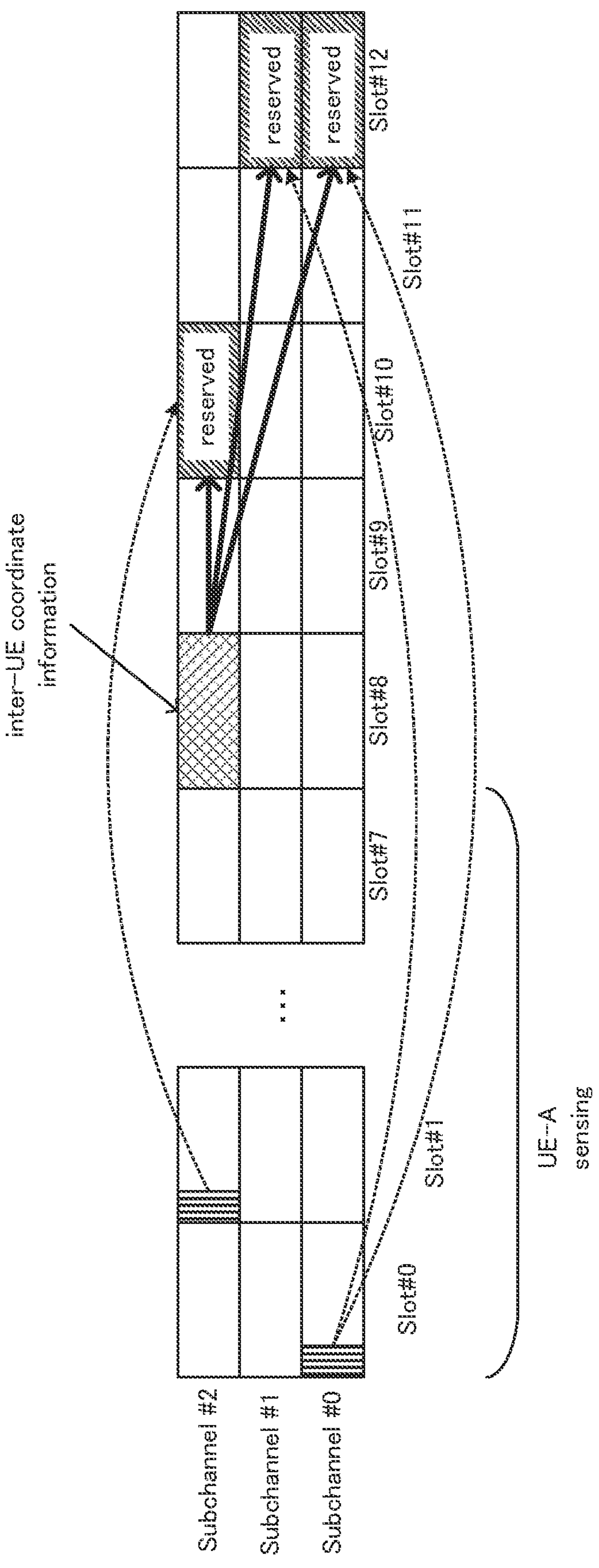
FIG. 8 illustrates exemplary transmission of resource usage adjustment information 1.

FIG. 8 illustrates a non-limiting example. As exemplified in FIG. 8, UE-A senses the 1st stage SCIs of other UEs in slots #0 to #7, and transmits the resource usage adjustment information (also referred to as inter-UE coordinate information) in slot #8. In this case, UE-A may collectively transmit, as the resource usage adjustment information, information of resources where transmission is scheduled, which is obtained from a plurality of 1st stage SCIs received before slot #8.

The following case is assumed as an example. Information sensed in slot #0 indicates that another UE possibly performs transmission in subchannel #2 of slot #10, and information sensed in slot #1 indicates that another UE possibly performs transmission in two subchannels #0 and #1 of slot #12.

In this case, the resource usage adjustment information indicates that subchannel #2 of slot #10 and subchannels #0 and #1 of slot #12 are possibly used by other UEs. For this indication, a bitmap may be used representing a resource that is likely to be used as "1" and a resource that is less likely or not likely to be used as "0", for example. In addition, it may be configured so that a resource possibly used by another UE is indicated in units of slots.

Figure 9:
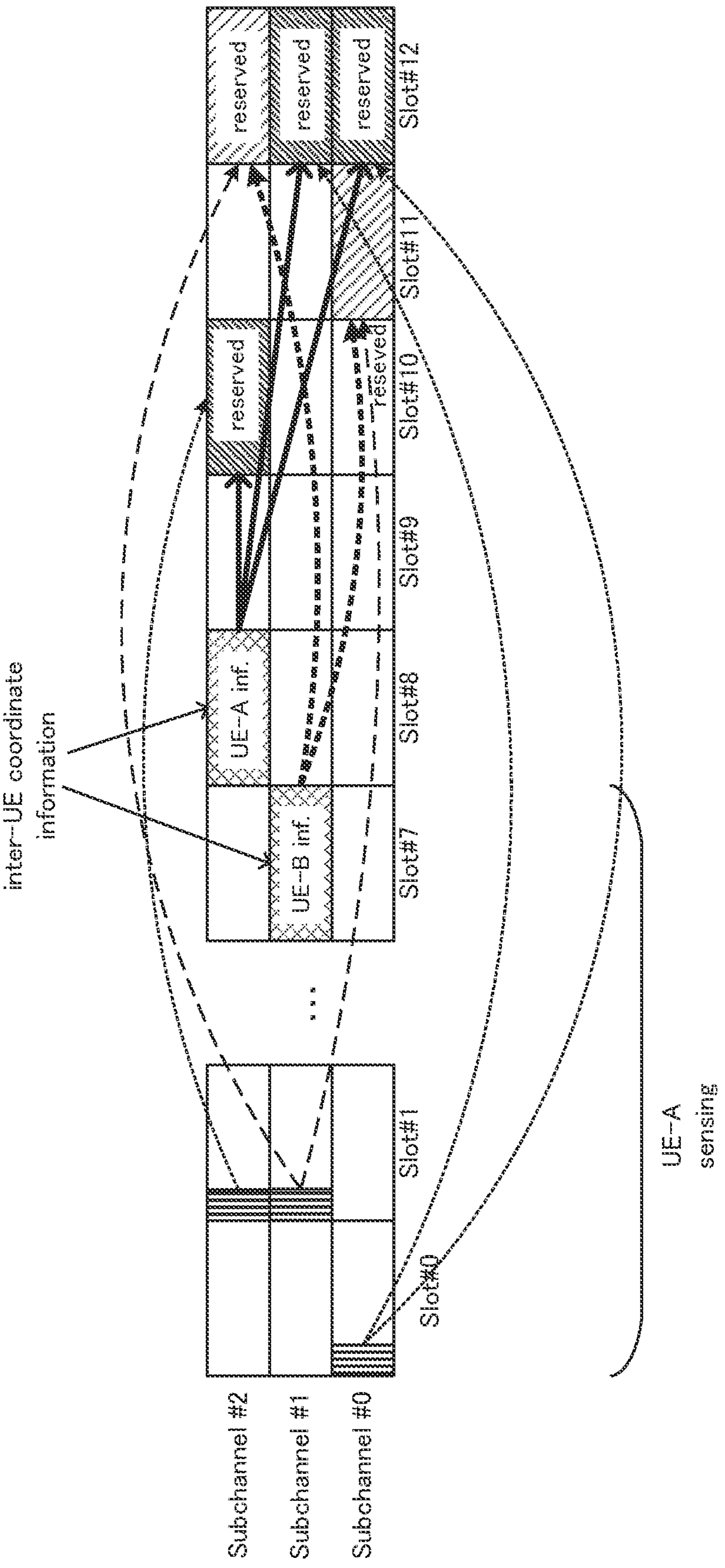
FIG. 9 illustrates other exemplary transmission of resource usage adjustment information 1.

Further, it is possible for a plurality of UEs to transmit the resource usage adjustment information each other so as to compensate for information that has not been received due to the half duplex issue. For example, as illustrated in FIG. 9, UE-A and UE-B can compensate each other for information on the resource usage that is not obtained in each of UE-A and UE-B by transmitting the resource usage adjustment information each other.

Resource Usage Adjustment Information 2

UE-A may transmit information of resources that UE-A possibly uses, for example, as the resource usage adjustment information. This may be the same as information transmitted in the 1st stage SCI in sidelink of rel. 16 NR. The 1st stage SCI in sidelink of rel. 16 NR can transmit information of resources to be used for transmission up to 32 slots ahead. When cancelling the scheduled transmission, however, UE-A need not use the resource indicated to be used for transmission.

Resource usage adjustment information 2 may indicate resources that are possibly used, for a longer period than the resource information transmitted in the 1st stage SCI of rel. 16 NR. Further, the 1st stage SCI in sidelink of rel. 16 NR indicates a resource transmission schedule in the same resource pool, but a transmission schedule for resources in a different resource pool may be indicated. The different resource pool may be in a band width part (BWP) on the same frequency band or in a different BWP. In addition, it may be a carrier to which the same cell ID is given, or may be a different carrier.

Resource Usage Adjustment Information 3

UE-A may transmit information of resources that UE-B can use for transmission, for example, as the resource usage adjustment information. For example, UE-A may select a resource suitable for transmission by UE-B as a candidate resource based on at least one of information of resources that are scheduled to be used for transmission by other UEs obtained by sensing and information obtained by channel quality measurement. Note that the “candidate resource” in this case may be referred to as a “recommended resource”. UE-A may transmit (or indicate) information of the selected candidate resource to UE-B as the resource usage adjustment information.

Note that non-limiting examples of the information obtained by the channel quality measurement are as follows:

Channel quality indicator (CQI);
Reference signal received power (RSRP),
Reference signal received quality (RSRQ); and
Signal to interference plus noise ratio (SINR).

The candidate resource indicated in the resource usage adjustment information transmitted from UE-A may be a single resource or two or more resources. In a case of two or more candidate resources, UE-B may select a resource to be used for transmission from the two or more candidate resources, for example.

Note that UE-B may determine a resource to be used for transmission or may determine not to perform transmission on its own without following an indication from UE-A (in other words, without using or ignoring the received resource usage adjustment information).

Figure 10:
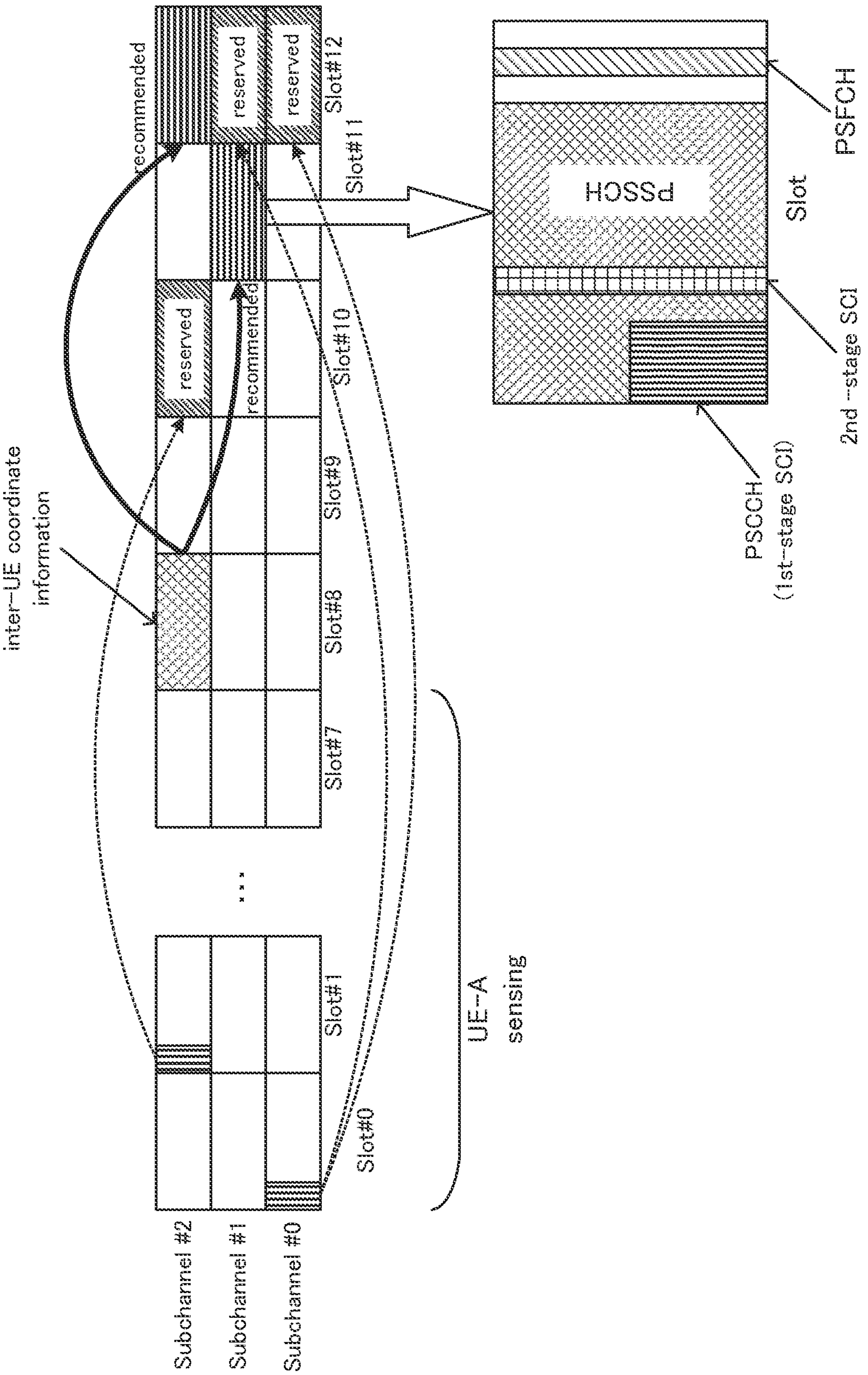
FIG. 10 illustrates exemplary transmission of resource usage adjustment information 3.

FIG. 10 illustrates a non-limiting example. As exemplified in FIG. 10, UE-A grasps resources that are possibly used by other UEs (represented as “reserved” in FIG. 10), from information obtained by sensing from slot #0 to slot #7.

For example, UE-A determines candidate resources that can be used for transmission by UE-B (represented as “recommended” in FIG. 10) from resources that are less likely to be used by other UEs (e.g., resources that are not “reserved”), and indicates, to UE-B, subchannel #1 of slot #11 and subchannel #2 of slot #12 as the candidate resources by the resource usage adjustment information in slot #8.

UE-B may select one of the two candidate resources (subchannel #1 of slot #11 and subchannel #2 of slot #12) indicated in the resource usage adjustment information and perform transmission using the selected resource. Note that UE-B may perform transmission using a resource other than the resource indicated in the resource usage adjustment information, or even need not perform transmission.

FIG. 10 illustrates an example where UE-B selects subchannel #1 of slot #11 from a plurality of candidate resources indicated in the resource usage adjustment information received from UE-A and performs transmission in the selected subchannel. In this case, the format used by UE-B for the transmission can be the same as the format in rel. 16.

Contrary to the example described above, UE-A may indicate a resource that is not suitable for transmission by UE-B (may be referred to as a “deprecated resource” for convenience) to UE-B by the resource usage adjustment information. In this case, UE-B may select and determine a resource to be used for transmission avoiding the resources indicated by the received resource usage adjustment information. The deprecated resource may be selected and determined, for example, based on at least one of information of resources that are scheduled to be used for transmission by other UEs and information obtained by channel quality measurement.

Resource Usage Adjustment Information 4

UE-A may transmit information of a resource that UE-B uses for transmission as the resource usage adjustment information. This resource usage adjustment information may be considered to correspond to resource assignment information (or scheduling information) for another UE. UE-B performs transmission according to the resource assignment (i.e., resource scheduling) by UE-A.

Resource usage adjustment information 4 transmitted by UE-A may be information for a single UE or information for a plurality of UEs. UE-A that transmits the resource usage adjustment information for a plurality of UEs may be referred to as a header UE. UE-A performs scheduling for UEs in a group or in the vicinity, as does base station 100 (e.g., gNB).

The scheduling information may be configured to be received only by UE-B that receives resource usage adjustment information 4 and performs transmission based on the information, or may be configured to be received also by destination UE to which UE-B performs transmission.

In a case where the destination UE to which UE-B performs transmission also receives the resource usage adjustment information, UE-B can be ready to receive transmission by the destination UE in a resource specified for the destination UE, thereby avoiding the half duplex issue. In addition, UE-B is ready for reception in the specified resource and stops receiving in other resources, thereby reducing power consumption.

Figure 11:
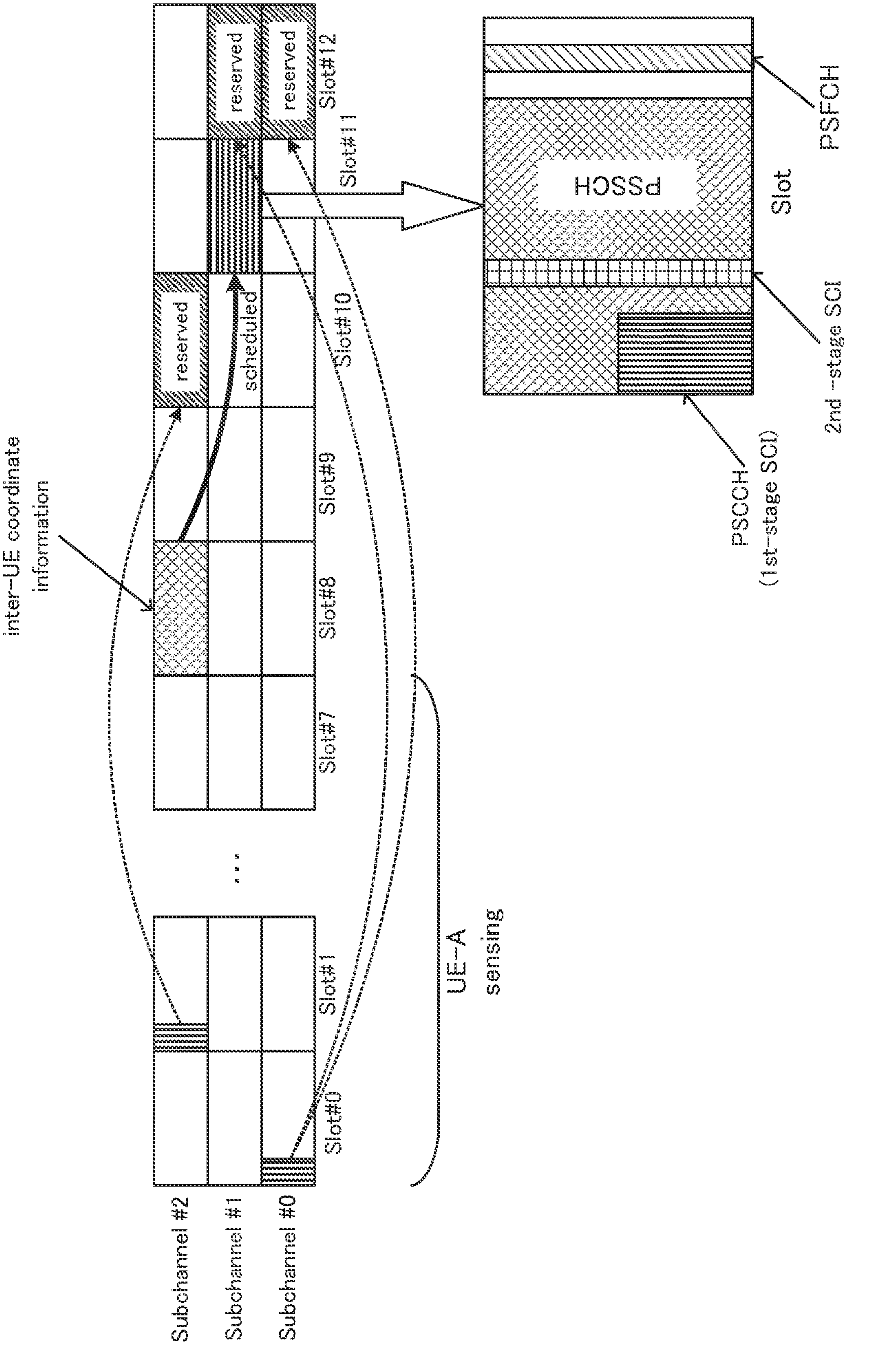
FIG. 11 illustrates exemplary transmission of resource usage adjustment information 4.

FIG. 11 illustrates a non-limiting example. As exemplified in FIG. 11, UE-A grasps resources that are possibly used by other UEs (represented as “reserved” in FIG. 11), from information obtained by sensing from slot #0 to slot #7, as is the case with resource usage adjustment information 3.

Then. UE-A determines, for example, a resource to assign for transmission by UE-B (represented as “scheduled” in FIG. 11) from resources that are less likely to be used by other UEs (e.g., resources that are not “reserved”), and indicates subchannel #1 of slot #11 as the resource assignment information for UE-B by resource usage adjustment information 4 in slot #8.

UE-B performs transmission in the resource (subchannel #1 of slot #11 in FIG. 11) indicated (i.e., scheduled) by UE-A. In this case, the format used by UE-B for the transmission can be the same as the format of rel. 16.

Items Common to Embodiments

In a case where UE-A corresponds to reception UE (Rx UE) for UE-B, information of resources that can be used by UE-B, which is included in the resource usage adjustment information transmitted by UE-A, may be selected from slots where UE-A is ready for reception. This allows UE-A to avoid failing to receive a signal transmitted by UE-B due to UE-A being in a transmission state.

Further, the information of resources that can be used for transmission by UE-B, which is transmitted from UE-A to UE-B, may be limited to information of resources to be used by UE-B for transmission addressed to UE-A, or may include information of resources to be used by UE-B for transmission addressed to UE other than UE-A. For the resource to be used by UE-B for transmission addressed to UE other than UE-A, UE-A may specify the destination UE of the transmission by UE-B.

The timing for UE to transmit the resource usage adjustment information may be configured to be periodic or aperiodic. In a periodic case, the period may be set in units of, for example, 10, 11, . . . , 160, 200, 300 (m seconds or slots). In an aperiodic case, the resource usage adjustment information may be configured to be transmitted with a data signal when UE-A transmits the data signal, or may be configured to be transmitted when transmission of the resource usage adjustment information is requested from another UE.

The resource information transmitted by resource usage adjustment information 1, 2, 3, or 4 is described as information indicating the slot number and the subchannel number, but the time-direction information may be a symbol number, or a different time unit called a subslot or a subframe, instead of the slot number. Although the frequency-direction information is described as a subchannel, the information may be a resource block or a different frequency unit such as a subband, a resource pool, a BWP, or a carrier.

In the above description, resource usage adjustment information 2 may indicate resources that are possibly used, for a longer period than the resource information transmitted by the 1st stage SCI of rel. 16 NR. Other resource usage adjustment information 1, 3, and 4 may also indicate resources of 32 slots ahead, or indicate the resource usage adjustment information for an even longer period, for example.

Next, channels for transmitting the resource usage adjustment information will be described. Examples of the channels for transmitting the resource usage adjustment information include a PSSCH, the 2nd stage SCI, a new channel, a PSFCH, higher layer signaling, and the 1st stage SCI. It is also possible to transmit the resource usage adjustment information combining a plurality of channels.

PSSCH

UE-A may transmit the resource usage adjustment information using a PSSCH. The following two operation examples are exemplary methods of indicating that the resource usage adjustment information is included in a PSSCH.

PSSCH Operation Example 1

In PSSCH operation example 1, the 1st stage SCI or the 2nd stage SCI indicates that the resource usage adjustment information is included in a PSSCH, and the resource usage adjustment information is transmitted by the PSSCH.

The 2nd stage SCI may use SCI format 2-A or SCI format 2-B to indicate that the resource usage adjustment information is included in the PSSCH, or may use a new format with another name such as SCI format 2-C for the indication.

The PSSCH may be transmitted in any of cast types, which are broadcast, groupcast, and unicast. The cast type is indicated in SCI format 2-A. SCI format 2-B is a format used for groupcast. In a case of broadcast, the resource usage adjustment information can be received by any UE.

In a case of resource usage adjustment information 1 or resource usage adjustment information 2, it is not necessary to determine which UE the information is addressed to, and thus transmission using broadcast allows a plurality of UEs to share the status of resource usage.

Meanwhile, in a case of resource usage adjustment information 3 or resource usage adjustment information 4, for example, the PSSCH indication may include a destination ID, which is an ID for identifying UE, in order to clarify which UE the resource assignment information is addressed to.

In a case of groupcast, the resource usage adjustment information is transmitted to a UE group. The UE group can be identified based on destination IDs indicated by the 2nd stage SCI, for example. In the case of groupcast, UEs in the UE group can share the resource usage adjustment information.

In a case of resource usage adjustment information 3 or resource usage adjustment information 4, for example, the PSSCH indication may include a destination ID, which is an ID for identifying the destination UE, in order to clarify which UE the resource assignment information is addressed to, as is the case with broadcast.

In a case of unicast, the resource usage adjustment information is transmitted to certain UE. The destination UE can be identified from a destination ID indicated in the 2nd stage SCI, and thus the destination UE can be determined even when the PSSCH includes no destination ID.

When the resource usage adjustment information is included in a PSSCH, the resource usage adjustment information may be encoded as a data signal in the PSSCH or may be encoded separately from a data signal in the PSSCH.

Figure 12:
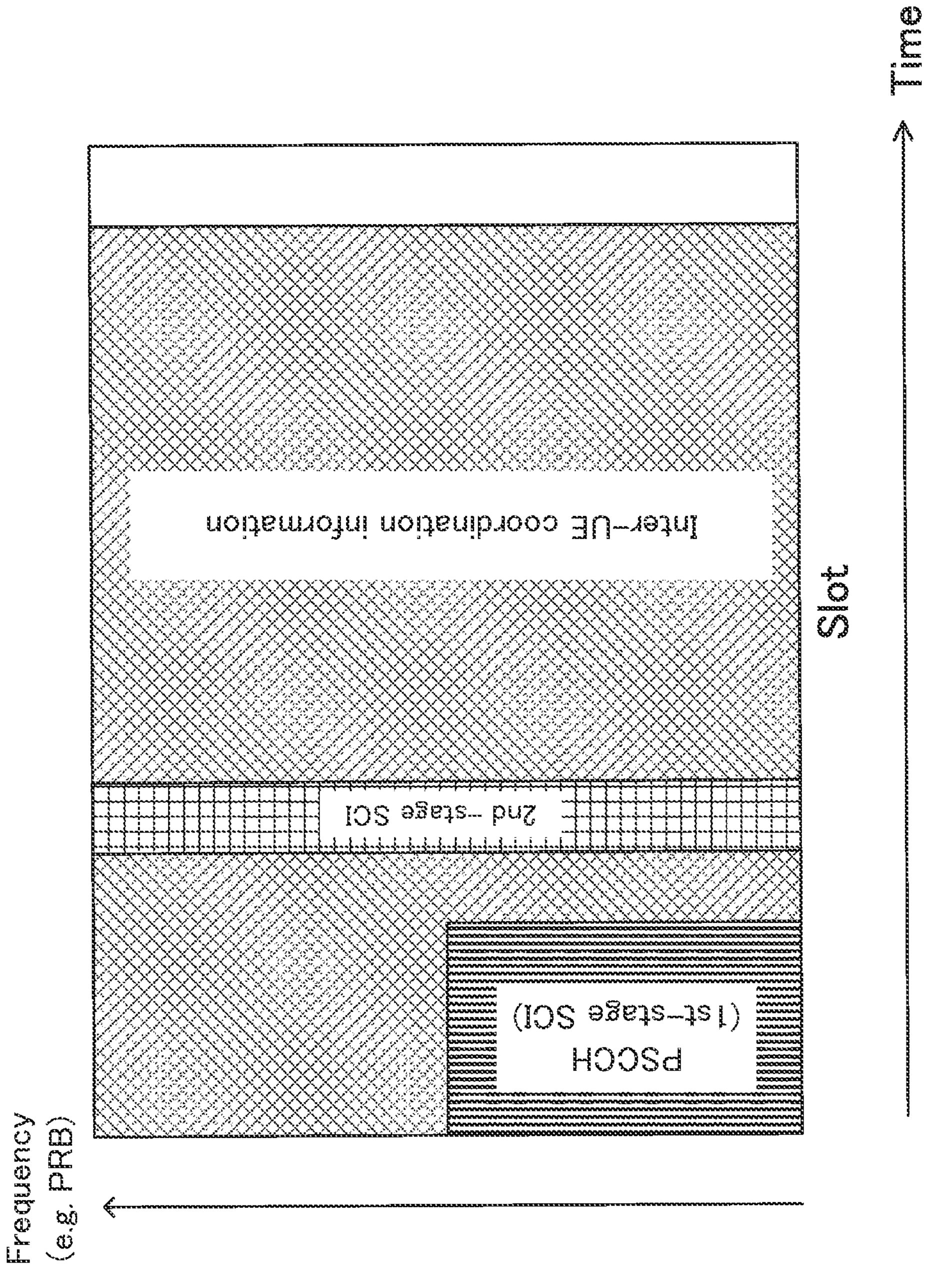
FIG. 12 illustrates physical SL shared channel (PSSCH) operation example 1.

FIG. 12 illustrates an example where the resource usage adjustment information is transmitted in a PSSCH area. As exemplified in FIG. 12, a candidate resource where the resource usage adjustment information is transmitted (or mapped) in a slot may be the entire PSSCH area.

Figure 13:
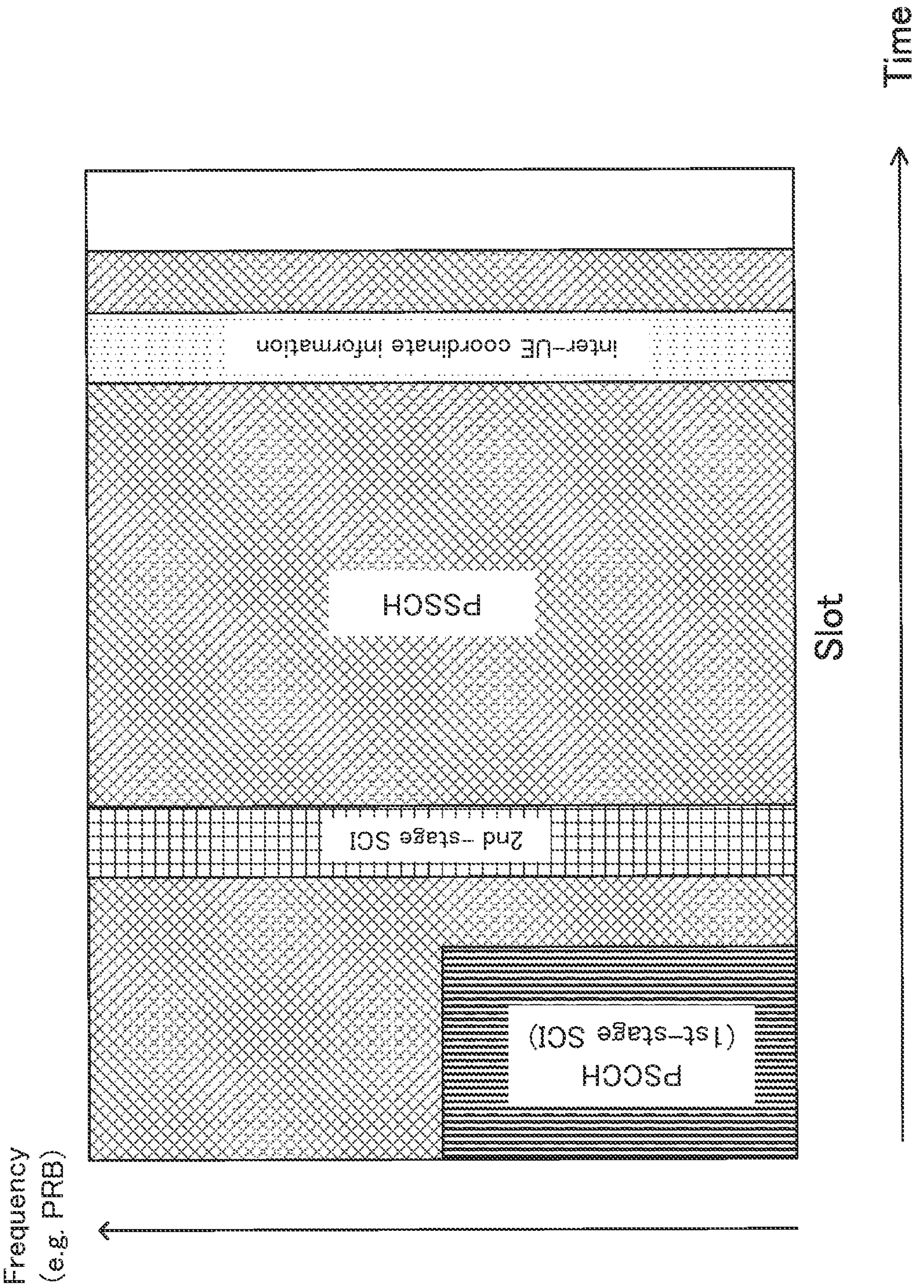
FIG. 13 illustrates a variation of PSSCH operation example 1.

In a case where the resource usage adjustment information is encoded separately from a data signal in the PSSCH, a resource may be reserved in the PSSCH for transmitting the resource usage adjustment information, as illustrated in FIG. 13 for example. In other words, a candidate resource where the resource usage adjustment information is transmitted (or mapped) in a slot may be a partial resource of the PSSCH area. For the resource for transmitting the resource usage adjustment information, it may be determined in advance which symbols and which subcarriers in the PSSCH are used, for example.

When the resource usage adjustment information is decoded separately from a data signal of the PSSCH, for example, the resource usage adjustment information can be advantageously decoded prior to the data signal. In the case where the resource usage adjustment information and a data signal of the PSSCH are decoded separately, the amount of data that can be transmitted in the PSSCH varies depending on the size of the resource usage adjustment information. Thus, the transport block size (TBS), which is the amount of data to be transmitted in the PSSCH, may be calculated based on a resource excluding the amount of resources of the resource usage adjustment information, for example.

In a case where SCI format 2-A or SCI format 2-B indicates that the resource usage adjustment information is included in the PSSCH, for example, a bit may be added to SCI format 2-A or SCI format 2-B for indicating that the resource usage adjustment information is included in the PSSCH. Alternatively, a bit in SCI format 2-A or SCI format 2-B may be replaced with the bit indicating that the resource usage adjustment information is included in the PSSCH.

When the indication bit is added, the number of bits in SCI format 2-A or SCI format 2-B is different compared to when no indication bit is added. When a bit in SCI format 2-A or SCI format 2-B is replaced with the indication bit, the information content of SCI format 2-A or SCI format 2-B is different.

Thus, the fact that the number of bits is different or that a bit is replaced is indicated in advance, for example, by a higher layer (e.g., RRC) or configured in advance as called pre-configured. This allows the indicated or configured UE to change the number of reception bits or replace a bit in the 2nd stage SCI.

It is also possible to configure so that the 1st stage SCI indicates the change in the number of bits or the replacement of the bit. For example, reserved bits included in the 1st stage SCI may be used to indicate that the number of bits is different or a bit is replaced in SCI format 2-A or SCI format 2-B.

Further, SCI format 2-A may indicate that the resource usage adjustment information is included in the PSSCH by setting a HARQ feedback enabled/disabled indicator to enable and setting a cast type indicator to broadcast. This combination does not exist in rel. 16, and the HARQ feedback cannot be configured for broadcast. Legacy UE that has received this signal possibly determines that the reception of SCI format 2-A is failed since the combination does not exist, but UE that knows the new configuration can determine that it is an indication of the resource usage adjustment information being included in the PSSCH.

In a case where a new SCI format is used to indicate that the resource usage adjustment information is included in the PSSCH, UE can receive the new SCI format by indicating the use of the new SCI format in advance by a higher layer (e.g., RRC, etc.), configuring the use of the new SCI format in advance as called pre-configured, or instructing reception of the new SCI format in reserved bits included in the 1st stage SCI.

In addition, in a case where SCI format 2-A, SCI format 2-B, or a new SCI is used to indicate that the resource usage adjustment information is included in the PSSCH, the indication may be performed by a destination ID or a source ID.

For example, the destination ID or the source ID to be used when the resource usage adjustment information is transmitted in the PSSCH is configured in advance. The preconfigured destination ID or source ID is different from the destination ID or the source ID to be used when other PSSCH data is transmitted.

This allows UE that has received SCI format 2-A, SCI format 2-B, or a new SCI to recognize that the resource usage adjustment information is included in the PSSCH from the destination ID or the source ID.

Further, in a case where the 1st stage SCI is used to indicate that the resource usage adjustment information is included in the PSSCH, this indication may be performed by using a reserved bit, for example.

PSSCH Operation Example 2

In PSSCH Operation Example 2, for example, a MAC header (also referred to as a sub-header) indicates that a MAC control element (CE) has an area for transmitting the resource usage adjustment information, and the resource usage adjustment information is transmitted in the MAC CE. The MAC header and the MAC CE are transmitted in a data area of the PSSCH.

2nd Stage SCI

The resource usage adjustment information may be transmitted in the 2nd stage SCI or a new SCI format. In a case where the resource usage adjustment information is transmitted in SCI format 2-A or SCI format 2-B, an indication bit may be added to SCI format 2-A or SCI format 2-B. Alternatively, a bit in SCI format 2-A or SCI format 2-B is replaced with the indication bit.

When the indication bit is added, the number of bits in SCI format 2-A or SCI format 2-B is different compared to when no indication bit is added. When a bit in SCI format 2-A or SCI format 2-B is replaced with the indication bit, the information content of SCI format 2-A or SCI format 2-B is different.

Thus, the fact that the number of bits is different or that a bit is replaced is indicated in advance, for example, by a higher layer (e.g., RRC) or configured in advance as called pre-configured.

This allows the indicated or configured UE to change the number of reception bits or replace a bit in the 2nd stage SCI. It is also possible to configure so that the 1st stage SCI indicates the change in the number of bits or the replacement of the bit in the 2nd stage SCI. In addition, reserved bits included in the 1st stage SCI may indicate that the number of bits is different or a bit is replaced in SCI format 2-A or SCI format 2-B.

For example, in a case where SCI format 2-B is used, the HARQ feedback enabled/disabled indicator may be set to disabled, and the resource usage adjustment information may be transmitted using the following:

Zone ID—12 bits, and

Communication range requirement—4 bits.

In broadcast using SCI format 2-B, when no HARQ feedback is requested (e.g., in a case of disabled), information of the zone ID and the communication range requirement is not used since it is information used for the HARQ feedback. Thus, these bits may be used for the resource usage adjustment information.

In a case where a new SCI format is used to indicate the resource usage adjustment information, UE can receive the new SCI format by indicating the use of the new SCI format in advance by a higher layer (e.g., RRC), configuring the use of the new SCI format in advance as called pre-configured, or instructing reception of the new SCI format in reserved bits included in the 1st stage SCI. Since the new format includes the resource usage adjustment information, it may be a format with a larger number of bits and a larger payload size than SCI format 2-A or SCI format 2-B.

In a case where SCI format 2-A, SCI format 2-B, or a new SCI is used to indicate the resource usage adjustment information, the presence of the resource usage adjustment information may be indicated by a destination ID or a source ID. For example, the destination ID or the source ID to be used when the resource usage adjustment information is transmitted is configured in advance. The preconfigured destination ID or source ID is different from the destination ID or the source ID to be used when other PSSCH data is transmitted.

This allows UE that has received SCI format 2-A, SCI format 2-B, or the new SCI to recognize that the resource usage adjustment information is included in the 2nd stage SCI from the destination ID or the source ID. Which bit in SCI format 2-A, SCI format 2-B, or the new SCI is to be replaced with the resource usage adjustment information is determined in advance, for example.

Further, SCI format 2-A may indicate the presence of the resource usage adjustment information by setting a HARQ feedback enabled/disabled indicator to enable and setting a cast type indicator to broadcast. This combination does not exist in rel. 16, and the HARQ feedback cannot be configured for broadcast. Legacy UE that has received this signal possibly determines that the reception of SCI format 2-A is failed since the combination does not exist, but UE that knows the new configuration can determine that it is an indication of the presence of the resource usage adjustment information. At that time, a part of information in SCI format 2-A may be replaced with the resource usage adjustment information.

New Channel

The resource usage adjustment information may be transmitted by a new channel. In a case where the resource usage adjustment information is indicated by a new channel, UE can receive the new channel by indicating the use of the new channel in advance by a higher layer (e.g., RRC), configuring the use of the new channel in advance as called pre-configured, or indicating the presence of the resource usage adjustment information in the new channel in reserved bits included in the 1st stage SCI or the 2nd stage SCI.

Figure 14:
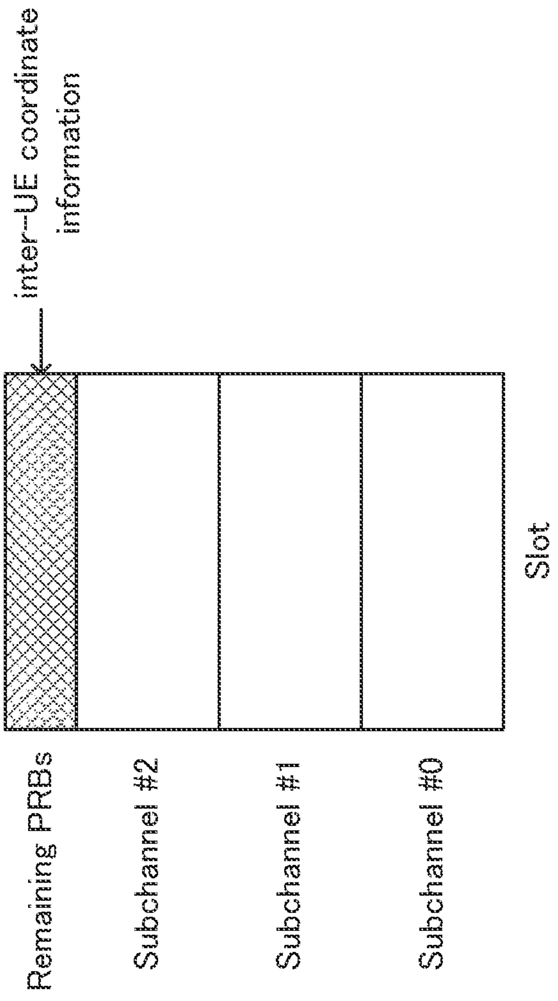
FIG. 14 illustrates an exemplary configuration of a new channel for resource usage adjustment information.

The new channel may be mapped to a PRB, a subchannel, a resource pool, a BWP, or a carrier other than the existing channels. For example, in Rel. 16, when the number of PRBs in a resource pool is not a multiple of the number of PRBs included in a subchannel, the remaining PRB(s) are not used for resource assignment. Thus, a new channel may be mapped to the remaining PRB(s) as illustrated in FIG. 14, for example, and the resource usage adjustment information may be transmitted in this new channel. This provides a benefit of improving resource utilization efficiency. Note that the new channel may be configured over the entire slot, may be configured only to a part of the slot, or may be configured over a plurality of slots.

PSFCH

The resource usage adjustment information may be transmitted by a PSFCH. The PSFCH in Rel. 16 is supposed to transmit one bit of ACK/NACK in one symbol, which is the same format as PUCCH format 0. The format here indicates the number of symbols, the sequence, the mapping of DMRS, and the like.

The PSFCH where the resource usage adjustment information is mapped may have a format different from the PSFCH in Rel. 16. The different format may be, for example, a format similar to PUCCH format 1, 2, 3, or 4. For example, more than 2 bits can be mapped in PUCCH formats 2, 3, and 4, and thus they are suitable when the amount of the resource usage adjustment information is more than 2 bits. The PSFCH may also be configured using a format different from the PUCCH formats.

In a case where the resource usage adjustment information is transmitted by the PSFCH, the resource usage adjustment information may be configured to be transmitted upon a request from another UE. For example, UE-A transmits the resource usage adjustment information by the PSFCH when UE-B requests UE-A to transmit the resource usage adjustment information.

In this manner, a resource to be used for the PSFCH transmitted by UE-A can be determined at the time of transmission by UE-B. UE-A need not indicate information on mapping of resources and modulation for the PSFCH by information such as the 1st stage SCI or the 2nd stage SCI, as in the case of transmitting a PSSCH. Thus, the PSFCH may be transmitted without transmitting the 1st stage SCI or the 2nd stage SCI, for example, thereby reducing the overhead of resource usage.

[RRC]

The resource usage adjustment information may be transmitted using, for example, RRC in Uu link or PC5 RRC between UEs. Alternatively, some of the resource usage adjustment information may be transmitted using RRC or PC5 RRC and other resource usage adjustment information may be transmitted by any of the methods described in the above operation examples. For example, information having a long assignment period may be transmitted using RRC or PC5 RRC, and information having a short assignment period may be transmitted by any of the methods described in the above operation examples.

1st Stage SCI

The resource usage adjustment information may be transmitted by the 1st stage SCI. For example, in a case of resource usage adjustment information 3 or resource usage adjustment information 4, the 1st stage SCI may be used when UE-A transmits the resource usage adjustment information for UE-B.

1st Stage SCI Operation Example 1

Figure 15:
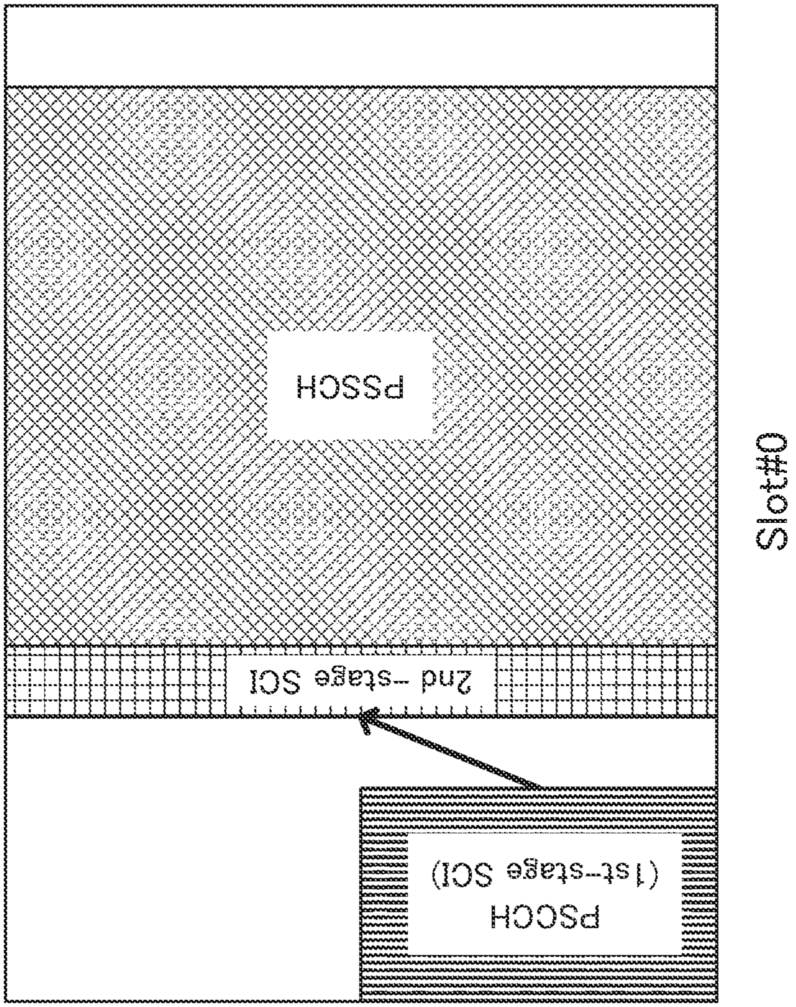
FIG. 15 illustrates 1st stage sidelink control information (SCI) operation example 1.

The resource usage adjustment information may be transmitted in a resource in the same slot as the 1st stage SCI. FIG. 15 illustrates an example.

For example, UE-A uses the 1st stage SCI to transmit resource assignment information for UE-B that performs transmission in the same slot. A reserved bit in the 1st stage SCI may be used to indicate which UE it is assigned to. UE-A does not perform transmission except for the 1st stage SCI in the same slot.

UE-B receives the 1st stage SCI, and when the resource addressed to UE-B is in the same slot as the slot in which the 1st stage SCI has been received, UE-B transmits the 2nd stage SCI and a PSSCH. In the case of resource usage adjustment information 3, however, UE-B need not perform transmission according to determination of UE-B itself.

This makes it possible to perform the PSSCH transmission assignment and the PSSCH transmission from different terminals in the same slot, thereby shortening the delay from the assignment to the data transmission. Note that the 1st stage SCI and the PSSCH area are allowed to be frequency-multiplexed in the frame format of rel. 16. Thus, it is preferable to avoid using the format of Rel. 16 as it is. With this regard, the 1st stage SCI transmitted by UE-A and the 2nd stage SCI and the PSSCH transmitted by UE-B are not frequency-multiplexed but time-multiplexed in such a manner that UE-B starts transmission X symbols after the 1st stage SCI, for example.

Note that UE-A may transmit the 1st stage SCI and the 2nd stage SCI, and UE-B may transmit a data portion of the PSSCH.

1st Stage SCI Operation Example 2

In the present operation example, the resource assignment of the own UE and the resource usage adjustment information addressed to another UE are transmitted by the 1st stage SCI. A reserved bit in the 1st stage SCI may be used to indicate which UE it is assigned to.

Time resource assignment of a time resource of two slots or three slots is possible in the time resource assignment by the 1st stage SCI. The first slot is a slot for transmitting the 1st stage SCI.

In the present operation example, the assignment of a slot same as the 1st stage SCI in the first slot is the assignment to UE same as the UE transmitting the 1st stage SCI, that is, it is a resource for UE-A, and the assignment of the second slot and the third slot is the assignment to another UE.

This provides a benefit of eliminating the need for changing the mapping (or format) of the 1st stage SCI, the 2nd stage SCI, and the PSSCH in the first slot compared to Rel. 16.

In the second slot and the third slot, the UE that the resource is assigned to in the first slot can transmit the 1st stage SCI and the 2nd stage SCI.

Figure 16:
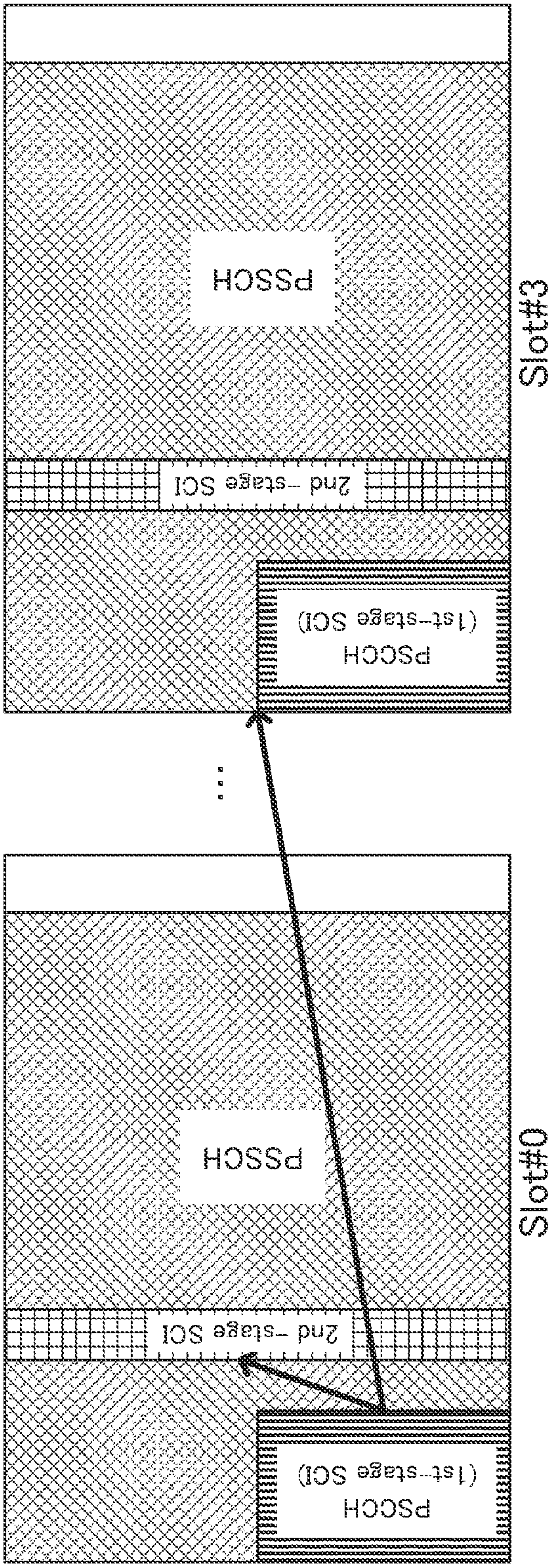
FIG. 16 illustrates 1st stage SCI operation example 2.

This enables transmission without changing the format from Rel. 16. FIG. 16 illustrates an example. In FIG. 16, UE-A indicates transmission in slot #3 to UE-B. UE-A performs transmission of UE-A in slot #0, and UE-B performs transmission in slot #3.

Since the present operation example eliminates the need for changing the format from Rel. 16, UE that does not support a function of receiving the resource usage adjustment information can also receive a resource.

1st Stage SCI Operation Example 3

In the present operation example, the 1st stage SCI indicates, to another UE, whether to transmit to a resource that has been periodically determined in advance by a higher layer or the like. A reserved bit in the 1st stage SCI, for example, may be used for this indication. This eliminates the need for transmitting resource assignment information in the 1st stage SCI, thereby reducing the number of bits.

Next, exemplary methods of determining UE transmitting the resource usage adjustment information will be described.

Method 1: Pre-Configuration

The UE transmitting the resource usage adjustment information may be, for example, determined by base station 100 (e.g., eNB or gNB) and configured in a system information block (SIB) called configured, a higher layer such as RRC, or MAC. Alternatively, the UE transmitting the resource usage adjustment information may be, for example, configured in advance in the specification as called pre-configured, configured in a SIM in advance, or configured in an application layer. For example, in a case where sidelink communication is used for communication such as mission critical communication, it is efficient to configure in advance which UE the resource usage adjustment information is transmitted from since this reduces unnecessary use of resources.

Method 2: S-SSB

The UE transmitting the resource usage adjustment information may be, for example, UE transmitting an S-SSB. The UE transmitting an S-SSB is, for example, UE that has established Uu link with base station 100. The UE transmitting an S-SSB may transmit the resource usage adjustment information with the S-SSB.

The S-SSB is a signal including an S-PSS, an S-SSS, and a PSBSH. The S-SSB is transmitted at a cycle of 160 ms, for example, and is used to acquire synchronization and transmit information in a PSBCH. When this S-SSB is transmitted, the resource usage adjustment information may be transmitted in a PRB adjacent to the S-SSB or in a symbol or slot adjacent to the S-SSB. This allows another UE to receive the resource usage adjustment information at fixed timings such as a cycle of 160 ms.

Method 3: Determined by UE

UE may determine whether to transmit the resource usage adjustment information. For example, UE generates a random value and compares the random value with a predetermined value, and the UE may determine to transmit the resource usage adjustment information when the random value is within a certain range. The random value may be generated based on information such as a UE ID, member ID, sequence used for scrambling, and slot number, for example. This prevents random transmission of the resource usage adjustment information by a large number of UEs.

Method 4: Determined According to PSSCH Condition

UE may transmit the resource usage adjustment information when the TBS to be transmitted is larger than a certain value (e.g., threshold). The larger the TBS is, the relatively smaller the overhead ratio of the resource usage adjustment information is, thereby reducing the impact on the resource usage.

UE may also transmit the resource usage adjustment information when the MCS is higher than a certain value (e.g., threshold). The higher the MCS is, the better the communication quality between UEs is, and thus it is expected that the UEs are close to each other, for example. In this case, the surrounding UEs are considered to be in a similar communication environment; accordingly, it is useful to share information obtained by sensing.

Method 5: Determined by Presence or Absence of Prior Communication

The UE transmitting the resource usage adjustment information may be UE performing sidelink communication with another UE previously (or in the past). For example, when there has been communication between UE-A and UE-B, UE-A may transmit the resource usage adjustment information. For example, UE-A that transmits the resource usage adjustment information may be the destination UE or the source UE for UE-B previously.

Method 6: UE Requested by Pedestrian UE

UE requested by pedestrian UE may transmit the resource usage adjustment information. Since the pedestrian UE is assumed to be a mobile terminal such as a smartphone, for example, there is a need for reducing power consumption as much as possible. With this regard, it is useful to have sensing information shared by another UE, and thus another UE requested by the pedestrian UE may transmit the resource usage adjustment information.

Method 7: Determined Based on Distance or SINR

The resource usage adjustment information may be transmitted when the SINR is higher than a certain value (e.g., threshold) or the distance between UEs is shorter than a certain distance (e.g., threshold). When the SINR is higher than a threshold or the distance is shorter than a threshold, the surrounding UEs are considered to be in a similar communication environment; accordingly, it is useful to share information obtained by sensing. The distance between UEs may be judged or determined based on the zone ID, for example. Alternatively or additionally, the distance between UEs may be judged or determined based on information from an application layer.

Others

The above-described embodiment has provided a description of a channel when the resource usage adjustment information is newly transmitted, but the method of mapping a new channel to a resource may be used for mapping of other new information. Examples of other new information include assignment information to a different carrier or BWP, information on whether repeat transmission is performed and the number of times, the format of a PSFCH, information specifying a transmission resource, information setting a transmission power, information specifying a transmission beam, information specifying the number of layers for multiple-input and multiple-output (MIMO) transmission, and information specifying whether a synchronization signal is transmitted and a resource therefor.

The above-described operation examples may be used in combination. For example, the operation example may be different for each UE, or single UE may transmit the resource usage adjustment information according to a plurality of operation examples. For example, UE that transmits resource usage adjustment information 2 may transmit resource usage adjustment information 2 using the 1st stage SCI and the PSSCH. At this time, the 1st stage SCI may indicate information up to 32 slots ahead, and the PSSCH may indicate information on slots further ahead.

In addition, UE called header UE may transmit resource usage adjustment information 3 or resource usage adjustment information 4 and another UE connected to the header UE may transmit resource usage adjustment information 1 or resource usage adjustment information 2, for example. This allows the header UE to receive, from another member UE, resource assignment information of other UEs that the header UE cannot receive during its transmission and compensate for the information.

UE that communicates in sidelink may include UE that performs only one of transmission and reception, and UE that performs both transmission and reception.

In a case where the configuration on sidelink is configured in advance, the configuration method may be configured in advance in the specification or configured in advance in a SIM, for example. The configuration method may also include a configuration in an application layer called Pre-configured, a configuration in an SIB called configured or a higher layer such as RRC, or a configuration in MAC.

The above-described embodiment may be applied to communication between base station 100 and terminal 200 by replacing the PSCCH with a PDCCH, the PSSCH with a PDSCH or a PUSCH, the PSFCH with a PUCCH, and the PSBCH with a PBCH. In addition, the above-described embodiment may be applied to UCI, which is uplink control information, transmitted in the PUSCH by replacing the 2nd stage SCI with the UCI.

Further, the above-described embodiment may be applied only to Mode 2 among Mode 1 and Mode 2 for sidelink.

The resource usage adjustment information may be shared with a plurality of UEs. This allows the UEs to compensate each other for sensing information that is not received due to the half duplex issue. UE configured to receive the resource usage adjustment information may be configured not to perform sensing. This facilitates reducing power consumption associated with sensing.

Embodiments of the present disclosure have been described, thus far.

Other Embodiments

Base Station

In the present disclosure, the base station may be a Transmission Reception Point (TRP), a clusterhead, an access point, a Remote Radio Head (RRH), an eNodeB (eNB), a gNodeB (gNB), a Base Station (BS), a Base Transceiver Station (BTS), a base unit or a gateway, for example. Further, in side link communication, a terminal may be adopted instead of a base station. The base station may be a relay apparatus that relays communication between a higher node and a terminal.

Uplink/Downlink/Sidelink

The present disclosure may be applied to any of uplink, downlink and sidelink. The present disclosure may be applied to, for example, uplink channels, such as a Physical Uplink Shared Channel (PUSCH), a Physical Uplink Control Channel (PUCCH), and a Physical Random Access Channel (PRACH), downlink channels, such as a Physical Downlink Shared Channel (PDSCH), a Physical Downlink Control Channel (PDCCH), and a PBCH, and side link channels, such as a PSSCH, a PSCCH, and a PSBCH. The PSCCH and PSSCH are examples of a sidelink control channel and a sidelink data channel, respectively. The PBCH and PSBCH are examples of a broadcast channel.

Data Channels/Control Channels

The present disclosure may be applied to any of data channels and control channels. The channels in the present disclosure may be replaced with, for example, data channels including the PDSCH, PUSCH and PSSCH and/or control channels including the PDCCH, PUCCH, PBCH, PSCCH, and PSBCH.

Reference Signals

In the present disclosure, the reference signals are signals known to both a base station and a terminal and each reference signal may be referred to as a reference signal (RS) or a pilot signal. The reference signal may be any of a DMRS, a Channel State Information-Reference Signal (CSI-RS), a Tracking Reference Signal (TRS), a Phase Tracking Reference Signal (PTRS), a Cell-specific Reference Signal (CRS), and a Sounding Reference Signal (SRS).

Time Intervals

In the embodiment described above, time resource units are not limited to one or a combination of slots and symbols, and may be time resource units, such as frames, superframes, subframes, slots, time slots, subslots, minislots, or time resource units, such as symbols, Orthogonal Frequency Division Multiplexing (OFDM) symbols, Single Carrier-Frequency Division Multiple Access (SC-FDMA) symbols, or other time resource units. The number of symbols included in one slot is not limited to any number of symbols exemplified in the embodiments described above, and may be other numbers of symbols.

Frequency Bands

The present disclosure may be applied to any of a licensed band and an unlicensed band.

Communication

The present disclosure may be applied to any of communication between a base station and a terminal, communication between terminals (Sidelink communication, Uu-link communication), and Vehicle to Everything (V2X) communication. The channels in the present disclosure may be replaced with, for example, a PSCCH, PSSCH, PSFCH, PSBCH, PDCCH, PUCCH, PDSCH, PUSCH, and PBCH.

In addition, the present disclosure may be applied to any of a terrestrial network or a network other than a terrestrial network (NTN: Non-Terrestrial Network) using a satellite or a High Altitude Pseudo Satellite (HAPS). Further, the present disclosure may be applied to a network having a large cell size, and a terrestrial network with a large delay compared with a symbol length or a slot length, such as an ultra-wideband transmission network.

<5G NR System Architecture and Protocol Stacks>

3GPP has been working at the next release for the 5th generation cellular technology, simply called 5G, including the development of a new radio (NR) access technology operating in frequencies ranging up to 100 GHz. The first version of 50 standard was initially delivered in late 2017, which allows proceeding to trials and commercial deployments of 5G NR standard-compliant terminals, e.g., smartphones.

Figure 17:
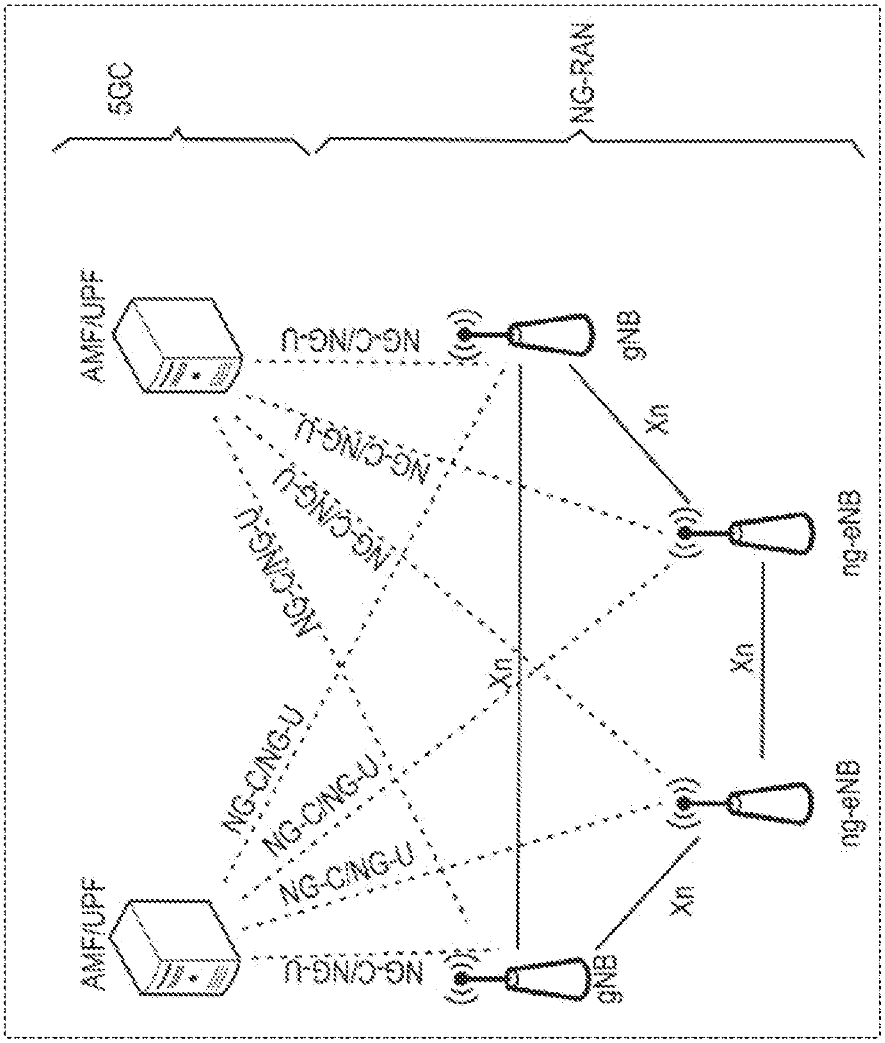
FIG. 17 illustrates an exemplary architecture for a 3GPP NR system.

For example, the overall system architecture assumes a Next Generation-Radio Access Network (NG-RAN) that includes gNBs. The gNBs provide the NG-radio access user plane (SDAP/PDCP/RLC/MAC/PHY) and control plane (RRC) protocol terminations towards a UE. The gNBs are interconnected with each other via an Xn interface. The gNBs are also connected to the Next Generation Core (NGC) via the Next Generation (NG) interface, more specifically to the Access and Mobility Management Function (AMF: e.g. a particular core entity performing the AMF) via the NG-C interface, and to the User Plane Function (UPF; e.g. a particular core entity performing the UPF) via the NG-U interface. The NG-RAN architecture is illustrated in FIG. 17 (see, for example, 3GPP TS 38.300 v 15.6.0, section 4).

The user plane protocol stack for NR (see, for example, 3GPP TS 38.300, section 4.4.1) includes the Packet Data Convergence Protocol (PDCP, see clause 6.4 of TS 38.300) Radio Link Control (RLC, see clause 6.3 of TS 38.300) and Medium Access Control (MAC, see clause 6.2 of TS 38.300) sublayers, which are terminated in the gNB on the network side. Additionally, a new access stratum (AS) sublayer (Service Data Adaptation Protocol: SDAP) is introduced above the PDCP (see, for example, clause 6.5 of 3GPP TS 38.300). A control plane protocol stack is also defined for NR (see, for example, TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For example, the Medium-Access-Control layer handles logical-channel multiplexing, and scheduling and scheduling-related functions, including handling of different numerologies.

The physical layer (PHY) is, for example, responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For example, the physical channels include a Physical Random Access Channel (PRACH), Physical Uplink Shared Channel (PUSCH), and Physical Uplink Control Channel (PUCCH) as uplink physical channels, and a Physical Downlink Shared Channel (PDSCH), Physical Downlink Control Channel (PDCCH), and Physical Broadcast Channel (PBCH) as downlink physical channels.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, the eMBB is expected to support peak data rates (20 Gbps for downlink and 10 Gbps for uplink) and user-experienced data rates in the order of three times what is offered by IMT-Advanced. Meanwhile, in a case of the URLLC, the tighter requirements are put on ultra-low latency (0.5 ms for each of UL and DL for user plane latency) and high reliability (1-10-5 within 1 ms). Finally, the mMTC may preferably require high connection density (1,000,000 devices/km2 in an urban environment), large coverage in harsh environments, and extremely long-life battery for low cost devices (15 years).

Thus, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (also referred to as TTI) than an mMTC service. Furthermore, deployment scenarios with large channel delay spreads may preferably require a longer CP duration than scenarios with short delay spreads. The subcarrier spacing may be optimized accordingly to retain the similar CP overhead. NR may support more than one value of subcarrier spacing. Correspondingly, subcarrier spacing of 15 kHz, 30 kHz, 60 kHz . . . are currently considered. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR, for each numerology and carrier, a resource grid of subcarriers and OFDM symbols is defined for each of uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 18:
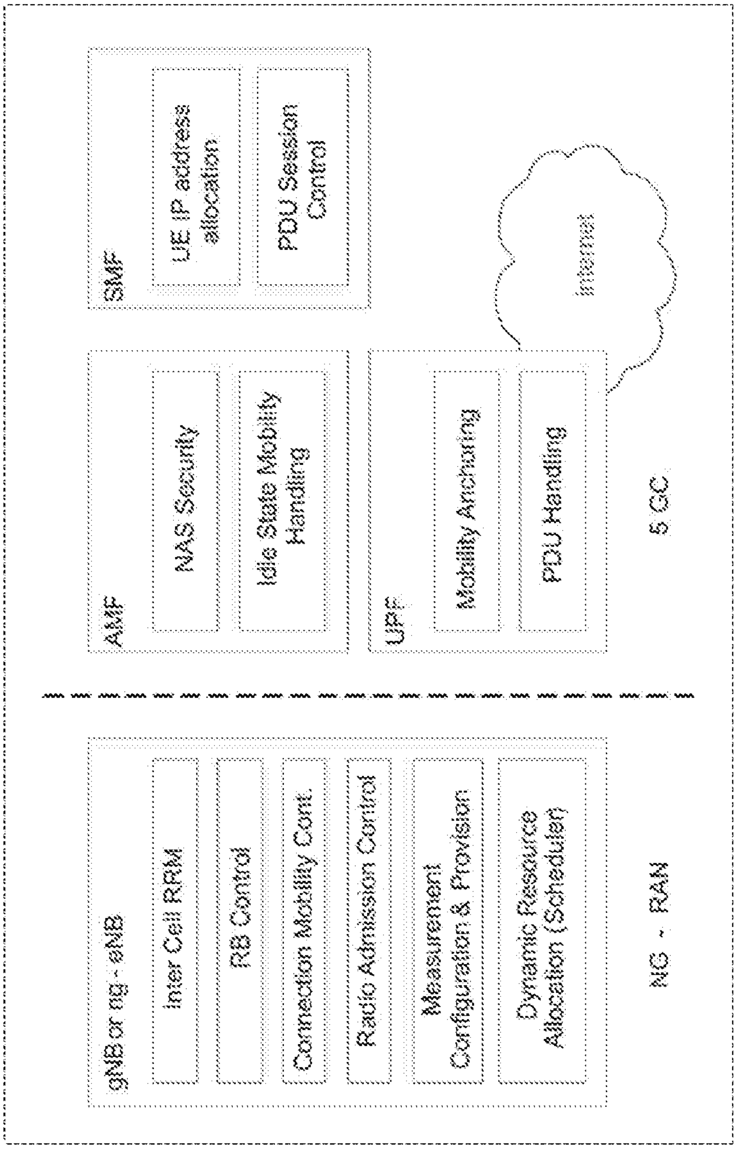
FIG. 18 is a schematic diagram illustrating functional split between NG-RAN and 5GC.

FIG. 18 illustrates functional split between NG-RAN and 5GC. An NG-RAN logical node is a gNB or ng-eNB. The 5GC has logical nodes AMF, UPF, and SMF.

For example, the gNB and ng-eNB host the following main functions:

- Functions for radio resource management such as radio bearer control, radio admission control, connection mobility control, dynamic allocation of resources to UEs in both uplink and downlink (scheduling);
- IP header compression, encryption, and integrity protection of data;
- Selection of an AMF at UE attachment when no routing to an AMF can be determined from the information provided by the UE;
- Routing of user plane data towards UPF(s);
- Routing of control plane information towards AMF;

Connection setup and release;
Scheduling and transmission of paging messages;
Scheduling and transmission of system broadcast information (originated from the AMF or Operation, Admission, Maintenance (OAM));
Measurement and measurement reporting configuration for mobility and scheduling;
Transport level packet marking in the uplink;
Session management;
Support of network slicing;
QoS Flow management and mapping to data radio bearers;
Support of UEs in RRC_INACTIVE state;
Distribution function for NAS messages;
Radio access network sharing;
Dual Connectivity; and
Tight interworking between NR and E-UTRA.

The access and mobility management function (AMF) hosts the following main functions:

Non-Access Stratum (NAS) signaling termination function;
NAS signaling security;
Access Stratum (AS) security control;
Inter Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

Furthermore, the user plane function (UPF) hosts the following main functions:

Anchor point for intra-/inter-RAT mobility (when applicable);
External protocol data unit (PDU) session point of interconnect to a data network;
Packet routing and forwarding;
Packet inspection and user plane part of policy rule enforcement;
Traffic usage reporting;
Uplink classifier to support routing traffic flows to a data network;
Branching point to support multi-homed PDU session;
QoS handling for user plane (e.g. packet filtering, gating, and UL/DL rate enforcement);
Uplink traffic verification (SDF to QoS flow mapping); and
Downlink packet buffering and downlink data indication triggering.

Finally, the session management function (SMF) hosts the following main functions:

Session management;
UE IP address allocation and management;
Selection and control of UPF;
Configuration function of traffic steering at a user plane function (UPF) to route traffic to proper destination;
Control part of policy enforcement and QoS; and
Downlink data indication.

RRC Connection Setup and Reconfiguration Procedures

Figure 19:
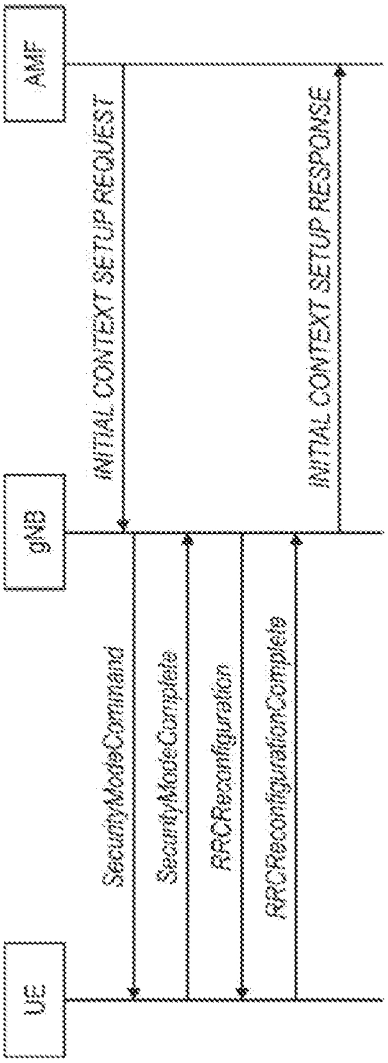
FIG. 19 is a sequence diagram for radio resource control (RRC) connection setup/reconfiguration procedures.

FIG. 19 illustrates some interactions between a UE, gNB, and AMF (an 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. This transition involves that the AMF prepares the UE context data (including, for example, PDU session context, security key, UE radio capability, and UE security capabilities, etc.) and transmits the UE context data to the gNB with an INITIAL CONTEXT SETUP REQUEST. Then, the gNB activates the AS security with the UE, which is performed by the gNB transmitting a SecurityModeCommand message to the UE and by the UE responding to the gNB using a SecurityModeComplete message. Afterwards, the gNB performs the reconfiguration to set up the Signaling Radio Bearer 2 (SRB2) and Data Radio Bearer(s) (DRB(s)) by transmitting an RRCReconfiguration message to the UE and, in response, receiving an RRCReconfigurationComplete from the UE. For a signaling-only connection, the steps relating to the RRCReconfiguration are skipped since the SRB2 and DRBs are not setup. Finally, the gNB indicates to the AMF that the setup procedure is completed with an INITIAL CONTEXT SETUP RESPONSE.

In the present disclosure, thus, an entity (e.g., AMF, SMF, etc.) of the 5th Generation Core (5GC) is provided that includes control circuitry, which, in operation, establishes a Next Generation (NG) connection with a gNodeB, and a transmitter, which in operation, transmits an initial context setup message, via the NG connection, to the gNodeB to cause a signaling radio bearer setup between the gNodeB and user equipment (UE). In particular, the gNodeB transmits a radio resource control (RRC signaling containing a resource allocation configuration information element (IE) to the UE via the signaling radio bearer. The UE then performs an uplink transmission or a downlink reception based on the resource allocation configuration.

Usage Scenarios of IMT for 2020 and Beyond

Figure 20:
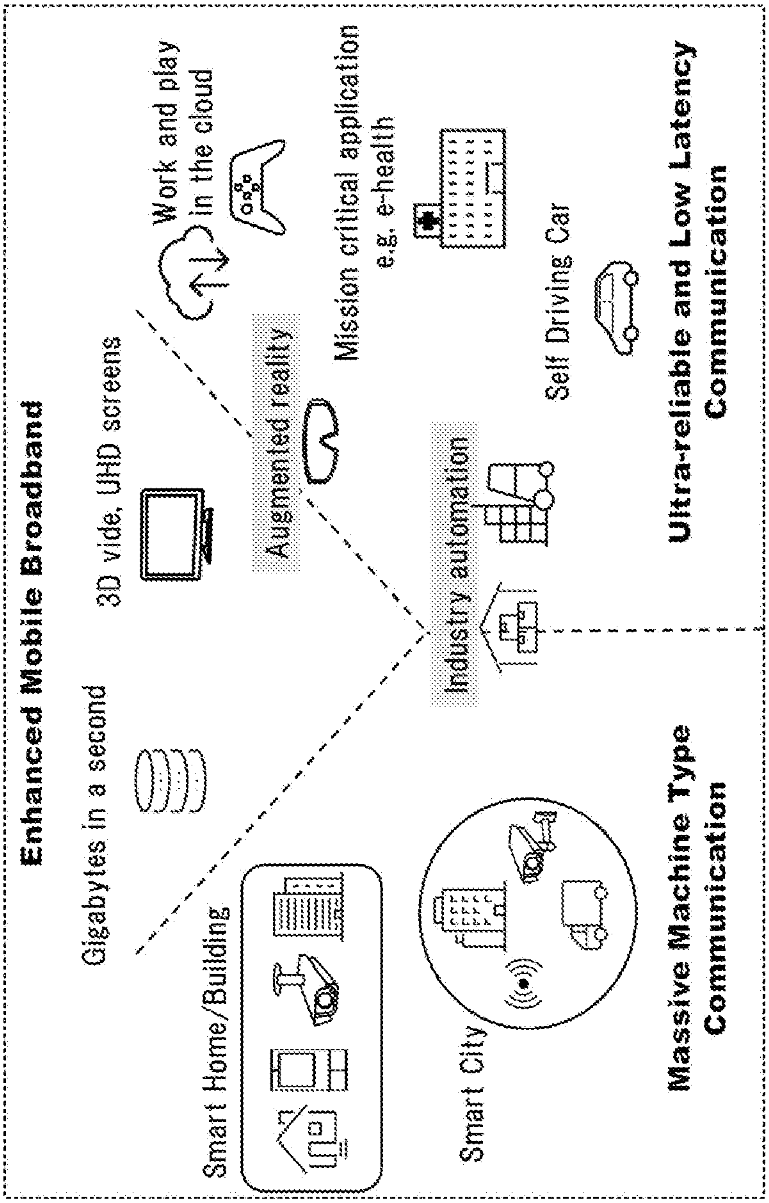
FIG. 20 is a schematic diagram illustrating usage scenarios of Enhanced Mobile Broadband (eMBB), Massive Machine Type Communications (mMTC), and Ultra Reliable and Low Latency Communications (URLLC)

FIG. 20 illustrates some of the use cases for 5G NR. In the 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 20 illustrates some examples of envisioned usage scenarios for IMT for 2020 and beyond (see, for example, ITU-R M. 2083 FIG. 2).

The URLLC use case has stringent requirements for capabilities such as throughput, latency, and availability. The URLLC use case has been envisioned as one of element techniques to enable future vertical applications such as wireless control of industrial manufacturing or production processes, remote medical surgery, distribution automation in a smart grid, transportation safety, etc. Ultra-reliability for the URLLC is to be supported by identifying the techniques to meet the requirements set by TR 38.913. For NR URLLC in Release 15, key requirements include a target user plane latency of 0.5 ms for uplink (UL) and 0.5 ms for downlink (DL). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for the URLLC, more compact DCI formats, repetition of PDCCH, etc. However, the scope may widen for achieving ultra-reliability as the NR becomes more stable and developed (for NR URLLC key requirements). Particular use cases of NR URLLC in Release 15 include augmented reality/virtual reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. The pre-emption means that a transmission for which resources have already been allocated is stopped, and the already allocated resources are used for another transmission that has been requested later but has lower latency/higher priority requirements. Accordingly, the already granted transmission is replaced with a later transmission. The pre-emption is applicable independent of the particular service type. For example, a transmission for a service-type A (URLLC) may be replaced with a transmission for a service type B (such as eMBB). Technology enhancements with respect to reliability improvement include dedicated CQI/MCS tables for the target BLER of 1E-5.

The use case of the mMTC (massive machine type communication) is characterized by a very large number of connected devices typically transmitting a relatively low volume of non-delay sensitive data. Devices are required to be low cost and to have a very long battery life. From the NR perspective, utilizing very narrow bandwidth parts is one possible solution to have power saving from the UE perspective and enable the long battery life.

As mentioned above, it is expected that the scope of reliability improvement in NR becomes wider. One key requirement to all the cases, and especially necessary for the URLLC and mMTC for example, is high reliability or ultra-reliability. Several mechanisms can be considered to improve the reliability from the radio perspective and network perspective. In general, there are a few key important areas that can help improve the reliability. These areas include compact control channel information, data/control channel repetition, and diversity with respect to the frequency, time, and/or spatial domain. These areas are applicable to reliability improvement in general, regardless of particular communication scenarios.

For NR URLLC, further use cases with tighter requirements have been considered such as factory automation, transport industry, and electrical power distribution. The tighter requirements are higher reliability (up to 10-6 level), higher availability, packet size of up to 256 bytes, time synchronization down to the order of a few μs where the value can be one or a few μs depending on frequency range and short latency in the order of 0.5 to 1 ms (e.g., target user plane latency of 0.5 ms) depending on the use cases.

Moreover, for NR URLLC, several technology enhancements from the physical layer perspective have been identified. These technology enhancements include Physical Downlink Control Channel (PDCCH) enhancements related to compact DCI, PDCCH repetition, and increased PDCCH monitoring. In addition, Uplink Control Information (UCI) enhancements are related to enhanced Hybrid Automatic Repeat Request (HARQ) and CSI feedback enhancements. Also, PUSCH enhancements related to mini-slot level hopping and retransmission/repetition enhancements have been identified. The term "mini-slot" refers to a transmission time interval (TTI) including a smaller number of symbols than a slot (a slot includes fourteen symbols).

QoS Control

The 5G Quality of Service (QoS) model is based on QoS flows and supports both QoS flows that require guaranteed flow bit rate (GBR QoS flows) and QoS flows that do not require guaranteed flow bit rate (non-GBR QoS Flows). At the NAS level, the QoS flow is thus the finest granularity of QoS differentiation in a PDU session. A QoS flow is identified within a PDU session by a QoS flow ID (QFI) carried in an encapsulation header over the NG-U interface.

For each UE, the 5GC establishes one or more PDU sessions. For each UE, the NG-RAN establishes at least one Data Radio Bearer (DRB) together with the PDU session, for example as illustrated above with reference to FIG. 19. Additional DRB(s) for QoS flow(s) of that PDU session can be subsequently configured (it is up to NG-RAN when to do so). The NO-RAN maps packets belonging to different PDU sessions to different DRBs. NAS level packet filters in the UE and 5GC associate UL and DL packets with QoS flows, whereas AS-level mapping rules in the UE and in the NO-RAN associate UL and DL QoS flows with DRBs.

Figure 21:
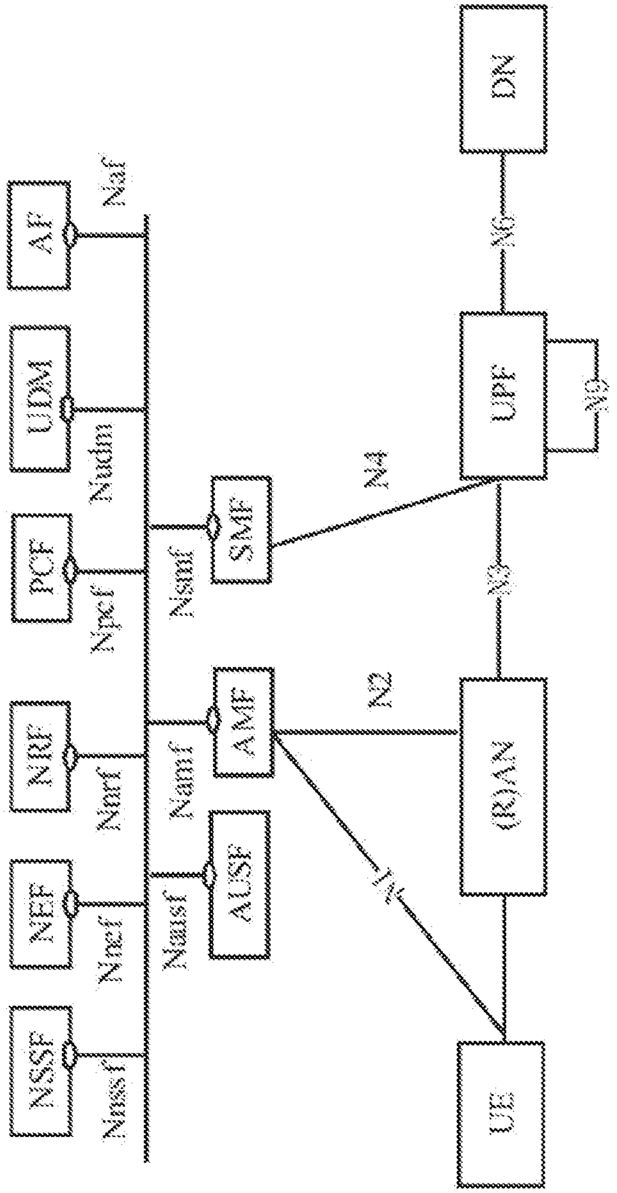
FIG. 21 is a block diagram illustrating an exemplary 5G system architecture for a non-roaming scenario.

FIG. 21 illustrates a 5G NR non-roaming reference architecture (see TS 23.501 v16.1.0, section 4.23). An Application Function (AF), e.g. an external application server hosting 5G services exemplified in FIG. 20, interacts with the 3GPP core network in order to provide services, for example, to support application influence on traffic routing, accessing a Network Exposure Function (NEF) or interacting with the policy framework for policy control (see Policy Control Function, PCF), e.g. QoS control. Based on operator deployment, application functions considered to be trusted by the operator can be allowed to interact directly with relevant network functions. Application functions not allowed by the operator to access directly the network functions use the external exposure framework via the NEF to interact with relevant network functions.

FIG. 21 illustrates further functional units of the 5G architecture, namely a Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g. operator services, Internet access, or 3rd party services. All of or a part of the core network functions and the application services may be deployed and running on cloud computing environments.

In the present disclosure, thus, an application server (for example, AF of the 5G architecture), is provided that includes a transmitter, which in operation, transmits a request containing a QoS requirement for at least one of the URLLC, eMMB, and mMTC services to at least one of functions (for example NEF, AMF, SMF, PCF, UPF, etc) of the 5GC to establish a PDU session including a radio bearer between a gNodeB and a UE in accordance with the QoS requirement, and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other “things” in a network of an “Internet of Things (IoT)”.

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A terminal according to an embodiment of the present disclosure may include: control circuitry, which, in operation, generates information on inter-UE coordinated usage of a sidelink resource: and transmission circuitry, which, in operation, transmits the information to another terminal.

In an embodiment of the present disclosure, the information includes at least one of information of a resource where the another terminal is scheduled to perform transmission, information of a resource where transmission by the transmission circuitry is scheduled, information of a resource recommended to the another terminal to use, and information of a resource not recommended to the another terminal to use.

In an embodiment of the present disclosure, the control circuitry does not cause the transmission circuitry to perform transmission in a resource indicated to be available by the information.

In an embodiment of the present disclosure, the control circuitry maps the information to a sidelink data channel, and the transmission circuitry transmits, to the another terminal, sidelink control information indicating that the information is transmitted in the sidelink data channel.

In an embodiment of the present disclosure, the control circuitry maps the information to second sidelink control information, and the transmission circuitry transmits, to the another terminal, the second sidelink control information or first sidelink control information, the second sidelink control information indicating that the information is transmitted in the second sidelink control information.

In an embodiment of the present disclosure, the control circuitry maps the information to a feedback channel of sidelink, and transmission of the information in the feedback channel is reserved based on prior communication with the another terminal.

In an embodiment of the present disclosure, the control circuitry maps the information to first sidelink control information, and includes, in the first sidelink control information, resource assignment information for a terminal different from the terminal that is a transmission source of the first sidelink control information.

A terminal according to an embodiment of the present disclosure may include: reception circuitry, which, in operation, receives information on inter-UE coordinated usage of a sidelink resource from another terminal; and control circuitry, which, in operation, determines a resource where transmission is performed in sidelink based on the information.

A sidelink communication control method according to an embodiment of the present disclosure may include: transmitting, by a first terminal, information on inter-UE coordinated usage of a sidelink resource; and determining, by a second terminal that has received the information, a resource where transmission is performed in sidelink based on the information.

The disclosure of Japanese Patent Application No. 2020-134851, filed on Aug. 7, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101 Resource usage adjustment information configurator
103 Error correction encoder
104 Modulator
106 Transmitter
107 Receiver

109 Demodulator

110 Error correction decoder

200 Terminal

201 Receiver

202 Signal separator

203 Demodulator

203-1 Uu demodulator

203-2 SL demodulator

204 Error correction decoder

204-1 Uu error correction decoder

204-2 SL error correction decoder

205 Resource usage adjustment information receiver .

206 Resource usage adjustment information generator

207 Error correction encoder

207-1 Uu error correction encoder

207-2 SL error correction encoder

208 Modulator

208-1 Uu modulator

208-2 SL modulator

209 Signal assigner

210 Transmitter

211-1 1st stage SCI receiver

211-2 2nd stage SCI receiver

212-1 1st stage SCI generator

212-2 2nd stage SCI generator

The invention claimed is:

1. A communication apparatus, comprising:

control circuitry, which, in operation, generates information on inter-User Equipment (UE) coordinated usage of a sidelink resource; and transmission circuitry, which, in operation, transmits first sidelink control information (SCI) and second SCI, wherein, the second SCI is mapped to a sidelink data channel, the second SCI has one of a plurality of second SCI formats, the plurality of second SCI formats include SCI format 2-A, SCI format 2-B and SCI format 2-C, the SCI format 2-C provides the information on inter-UE coordinated usage, and the first SCI includes a 2-bit field indicating the one of the plurality of second SCI formats is SCI format 2-A, SCI format 2-B, or SCI format 2-C.

2. The communication apparatus according to claim 1, wherein, the transmission circuitry transmits the second SCI to another communication apparatus, and the information on inter-UE coordinated usage includes at least one of first information of a resource where the another communication apparatus is scheduled to perform transmission, second information of a resource where transmission by the transmission circuitry is scheduled, third information of a preferred resource recommended to the another communication apparatus to use, and fourth information of a non-preferred resource not recommended to the another communication apparatus to use.

3. The communication apparatus according to claim 2, wherein the non-preferred resource is selected based on at least one of the second information and fifth information obtained by channel quality measurement.

4. The communication apparatus according to claim 2, wherein, the preferred resource is a single resource or two or more resources, and the non-preferred resource is a single resource or two or more resources.

5. The communication apparatus according to claim 1, wherein, the transmission circuitry transmits the second SCI to another communication apparatus, and the control circuitry does not cause the another communication apparatus to perform transmission in a resource indicated to be available by the information on inter-UE coordinated usage.

6. The communication apparatus according to claim 1, wherein, the transmission circuitry transmits the second SCI to another communication apparatus, the control circuitry maps the information on inter-UE coordinated usage to a sidelink data channel, and the transmission circuitry transmits, to the another communication apparatus, SCI indicating that the information on inter-UE coordinated usage is transmitted in the sidelink data channel.

7. The communication apparatus according to claim 1, wherein, the transmission circuitry transmits the second SCI to another communication apparatus, the control circuitry maps the information on inter-UE coordinated usage to a feedback channel of sidelink, and transmission of the information on inter-UE coordinated usage in the feedback channel is reserved based on prior communication with the another communication apparatus.

8. The communication apparatus according to claim 1, wherein the information on inter-UE coordinated usage is determined according to a resource available for reception.

9. The communication apparatus according to claim 1, wherein the information on inter-UE coordinated usage is indicated in units of slots.

10. The communication apparatus according to claim 1, wherein, the transmission circuitry transmits the second SCI to another communication apparatus, the second SCI indicates a destination ID, and the another communication apparatus is identified from the destination ID.

11. The communication apparatus according to claim 1, wherein, a media access control (MAC) header includes a MAC control element (CE) indicating transmission of the information on inter-UE coordinated usage of the sidelink resource, and the information on inter-UE coordinated usage is transmitted in the MAC CE.

12. The communication apparatus according to claim 1, wherein the second SCI includes a bit field for the information on inter-UE coordinated usage on a first subchannel and a second subchannel of a first slot, and the bit field includes one bit indicating one selected from a preferred resource set or a non-preferred resource set for the first slot.

13. The communication apparatus according to claim 1, wherein the second SCI includes a bit field for the information on inter-UE coordinated usage on a first subchannel of a first slot and a second subchannel of a second slot, and the bit field includes one bit indicating one selected from a preferred resource set or a non-preferred resource set for the first slot and the second slot.

14. A communication apparatus, comprising:
reception circuitry, which, in operation:
receives first sidelink control information (SCI) including a 2-bit field indicating a format of a plurality of second SCI formats, the plurality of second SCI formats including SCI format 2-A, SCI format 2-B, and SCI format 2-C;
receives second SCI having the indicated format; and
receives a sidelink data channel, wherein,
the second SCI is mapped to the sidelink data channel, and
one of the plurality of second SCI formats includes information on inter-UE coordinated usage; and
control circuitry, which, in operation, in response to the indicated format including the information on inter-UE coordinated usage, determines a resource where transmission is performed in sidelink based on the information on inter-UE coordinated usage included in the indicated format of the second SCI.

15. A sidelink communication control method, comprising:
transmitting first sidelink control information (SCI); and
transmitting second SCI, wherein,
the second SCI is mapped to a sidelink data channel,
the second SCI has one of a plurality of second SCI formats,
the plurality of second SCI formats include SCI format 2-A, SCI format 2-B, and SCI format 2-C, the SCI format 2-C providing information on inter-UE coordinated usage, and
the first SCI includes a 2-bit field indicating the one of the plurality of second SCI formats is SCI format 2-A, SCI format 2-B, or SCI format 2-C.

16. The sidelink communication control method according to claim 15, wherein a receiving communication apparatus determines to follow or ignore the information on inter-UE coordinated usage.

* * * * *